US008788482B2

(12) United States Patent
Hill

(10) Patent No.: US 8,788,482 B2
(45) Date of Patent: *Jul. 22, 2014

(54) JOIN TUPLE ASSEMBLY BY PARTIAL SPECIALIZATIONS

(75) Inventor: Gerhard Hill, St. Leon (DE)

(73) Assignee: SAP AG, Walldorf (DE)

( * ) Notice: Subject to any disclaimer, the term of this patent is extended or adjusted under 35 U.S.C. 154(b) by 7 days.

This patent is subject to a terminal disclaimer.

(21) Appl. No.: 13/616,044

(22) Filed: Sep. 14, 2012

(65) Prior Publication Data

US 2013/0006962 A1    Jan. 3, 2013

Related U.S. Application Data

(63) Continuation of application No. 12/781,855, filed on May 18, 2010, now Pat. No. 8,296,289.

(51) Int. Cl.
*G06F 7/00* (2006.01)
*G06F 17/30* (2006.01)

(52) U.S. Cl.
CPC .... *G06F 17/30498* (2013.01); *G06F 17/30595* (2013.01); *G06F 17/30466* (2013.01); *G06F 17/30445* (2013.01); *G06F 17/30454* (2013.01)
USPC .......................................... 707/714; 707/713

(58) Field of Classification Search
CPC ................ G06F 17/30498; G06F 17/30595; G06F 17/30466; G06F 17/30445; G06F 17/30454
USPC ....................................................... 707/714
See application file for complete search history.

(56) References Cited

U.S. PATENT DOCUMENTS

| 6,125,360 | A  | * | 9/2000  | Witkowski et al. ................... 1/1   |
| 6,134,534 | A  | * | 10/2000 | Walker et al. ...................... 705/5 |
| 6,496,819 | B1 | * | 12/2002 | Bello et al. ........................... 1/1 |
| 6,834,279 | B1 | * | 12/2004 | Chiang .............................. 1/1   |
| 2005/0050030 | A1 | * | 3/2005  | Gudbjartsson et al. ........... 707/3 |
| 2006/0031191 | A1 | * | 2/2006  | Faller et al. ....................... 707/2 |
| 2006/0085592 | A1 | * | 4/2006  | Ganguly et al. ............. 711/114 |
| 2006/0282424 | A1 | * | 12/2006 | Larson et al. ..................... 707/4 |

OTHER PUBLICATIONS

Bernstein et al., "Using Semi-Join to Solve Relational Queries", Journal of the ACM, 1981, pp. 25-40.*

* cited by examiner

*Primary Examiner* — Ajay Bhatia
*Assistant Examiner* — Jessica N Le

(57) ABSTRACT

Various embodiments of systems and methods for join tuple assembly by partial specializations are described herein. The join tuple assembly by partial specializations is a phase of the method for join query evaluation by semi-join reduction. By using partial specializations of the non-join part of the WHERE clause of a join query and matching sets, the join tuple assembly is organized in a manner that all computations are necessary, none are repeated, and failure to complete a partial join tuple to a full tuple is detected as early as possible. The method can be applied to inner and outer joins, and to arbitrary join graphs and non-join conditions in the WHERE clause. It can also be used outside the context of semi-join reductions.

21 Claims, 8 Drawing Sheets

| $R_1$ | a | b | c | d | e | z |
|---|---|---|---|---|---|---|
| 1 | 1 | 2 | 3 | 4 | 5 | 8 |
| 2 | 2 | 4 | 6 | 8 | 10 | 9 |
| 3 | 3 | 6 | 9 | 12 | 15 | 10 |
| 4 | 4 | 8 | 12 | 16 | 20 | 11 |
| 5 | 5 | 10 | 15 | 20 | 25 | 12 |

105

| $R_2$ | a | f | g | h | z |
|---|---|---|---|---|---|
| 1 | 0 | 6 | 9 | 10 | 30 |
| 2 | 0 | 8 | 9 | 5 | 20 |
| 3 | 1 | 10 | 9 | 10 | 10 |
| 4 | 2 | 12 | 9 | 5 | 5 |
| 5 | 3 | 14 | 9 | 10 | 0 |

110

| $R_3$ | b | i | j | k | z |
|---|---|---|---|---|---|
| 1 | 8 | 18 | 18 | 1 | 10 |
| 2 | 6 | 16 | 15 | 1 | 12 |
| 3 | 4 | 14 | 12 | 2 | 14 |
| 4 | 2 | 12 | 9 | 2 | 16 |
| 5 | 0 | 10 | 6 | 3 | 18 |

115

| $R_4$ | c | f | i | $\ell$ | z |
|---|---|---|---|---|---|
| 1 | 3 | 8 | 10 | 5 | 6 |
| 2 | 3 | 10 | 12 | 10 | 8 |
| 3 | 6 | 12 | 14 | 15 | 10 |
| 4 | 9 | 14 | 16 | 20 | 12 |
| 5 | 9 | 16 | 18 | 25 | 14 |

120

| $R_5$ | d | g | z |
|---|---|---|---|
| 1 | 4 | 9 | 20 |
| 2 | 8 | 9 | 12 |
| 3 | 12 | 9 | 4 |
| 4 | 16 | 9 | 20 |
| 5 | 20 | 9 | 30 |

125

| $R_6$ | e | j | z |
|---|---|---|---|
| 1 | 15 | 15 | 20 |
| 2 | 10 | 12 | 25 |
| 3 | 5 | 9 | 30 |
| 4 | 10 | 12 | 25 |
| 5 | 15 | 15 | 21 |

130

| $R_7$ | h | k | $\ell$ | z |
|---|---|---|---|---|
| 1 | 10 | 1 | 20 | 14 |
| 2 | 5 | 2 | 15 | 13 |
| 3 | 10 | 3 | 10 | 12 |
| 4 | 5 | 2 | 5 | 11 |
| 5 | 10 | 1 | 0 | 10 |

| $R_1$ | a | b | c | d | e | z |
|---|---|---|---|---|---|---|
| 2 | 2 | 4 | 6 | 8 | 10 | 9 |
| 3 | 3 | 6 | 9 | 12 | 15 | 10 |

405

| $R_2$ | a | f | g | h | z |
|---|---|---|---|---|---|
| 4 | 2 | 12 | 9 | 5 | 5 |
| 5 | 3 | 14 | 9 | 10 | 0 |

410

| $R_3$ | b | i | j | k | z |
|---|---|---|---|---|---|
| 2 | 6 | 16 | 15 | 1 | 12 |
| 3 | 4 | 14 | 12 | 2 | 14 |

415

| $R_4$ | c | f | i | ℓ | z |
|---|---|---|---|---|---|
| 3 | 6 | 12 | 14 | 15 | 10 |
| 4 | 9 | 14 | 16 | 20 | 12 |

420

| $R_5$ | d | g | z |
|---|---|---|---|
| 2 | 8 | 9 | 12 |
| 3 | 12 | 9 | 4 |

425

| $R_6$ | e | j | z |
|---|---|---|---|
| 1 | 15 | 15 | 20 |
| 2 | 10 | 12 | 25 |
| 4 | 10 | 12 | 25 |
| 5 | 15 | 15 | 21 |

430

| $R_7$ | h | k | ℓ | z |
|---|---|---|---|---|
| 1 | 10 | 1 | 20 | 14 |
| 2 | 5 | 2 | 15 | 13 |

JOIN TUPLE ASSEMBLY BY PARTIAL SPECIALIZATIONS

CROSS-REFERENCES TO RELATED APPLICATIONS

This application is a continuation application of U.S. patent application Ser. No. 12/781,855, filed May 18, 2010, now U.S. Pat. No. 8,296,289 which is incorporated herein by reference.

FIELD

Embodiments of the invention generally relate to the software arts, and, more specifically, to methods and systems for join query evaluation by semi-join reduction.

BACKGROUND

In the world of commercial computation, a major part of all computation is devoted to join evaluation. The cost in evaluating joins is high as well with respect to memory consumption as to processing time. A common technique for reducing the amount of data is the use of semi-joins. A join (e.g., an SQL join) combines two or more tables in a database, producing a new one that can be saved as a table or used as an intermediate result of more complex computations. The join combines the fields from the two tables by using values that are common to each of them. A semi-join is a binary operator on two relations. If these relations are R and S, the result of the semi-join of R with S is the set of all rows in R for which there is a row in S that is equal on their common attribute value. A relation is a data structure that consists of a heading (an unordered set of attributes as columns in a table) and a body (an unordered set of rows that share the same type). In computer science, a row represents an ordered list of attribute values. An n-tuple is a sequence (or an ordered list) of "n" elements, where "n" is a positive integer.

A semi-join between two tables consists of rows from the first table where one or more matches are found in the second table. If there are two relations R and S, the difference between the semi-join of R with S and the join between R and S is: the semi-join is a subset of if alone, whereas the join is a subset of the product R×S. As a subset, the semi-join contains every row of R at most once. Even if S contains two matches for a row in R, only one copy of the row in R is retained. Conceptually, if J is the join between R and S, the semi-join is the projection of J to R.

A join query is typically processed in the following way: first, semi-join reductions of the sizes of the joining relations are performed; then, the reduced relations are assembled to compute the join, and finally from every tuple in the join the attributes referenced in the expressions in the SELECT clause are projected, the expressions are evaluated and the results are returned to the user.

SUMMARY

Various embodiments of systems and methods for join tuple assembly by partial specializations are described herein. In an embodiment, the method includes receiving a join query, a materialization graph representing a join part of the join query, and a plurality of matching sets. The method further includes configuring a tuple construction counter, which value indicates progression in an overall length of constructing a join tuple and an iterator that traverses through elements in a matching set from the plurality of matching sets. While the tuple construction counter value is a positive integer, a partial specialization of an operator tree is computed, wherein the operator tree represents a non-join part of the join query. If the computed partial specialization satisfies the non-join part of the join query and the tuple construction counter value is less than the overall length of the join tuple, a subset of the plurality of matching sets are recomputed. Further, if no empty matching set is encountered during recomputation, the tuple construction counter value is increased.

In an embodiment, the system includes a database storage unit for storing one or more of a plurality of matching sets derived from semi-join reduction of a plurality of relations, a join query, and a materialization graph representing a join part of the join query. Further, the system includes a processor in communication with the database storage unit that executes instructions including: configuring a tuple construction counter, which value indicates progression in an overall length of constructing a join tuple and an iterator that traverses through elements in a matching set from the plurality of matching sets. While the tuple construction counter value is a positive integer, a partial specialization of an operator tree is computed, wherein the operator tree represents a non-join part of the join query. If the computed partial specialization satisfies the non-join part of the join query and the tuple construction counter value is less than the overall length of the join tuple, a subset of the plurality of matching sets are recomputed. Further, if no empty matching set is encountered during recomputation, the tuple construction counter value is increased.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 1 is a block diagram illustrating a number of exemplary relations.

FIG. 4 is a block diagram illustrating reduced relations $R_1$, $R_2$, $R_3$, $R_4$, $R_5$, $R_6$, and $R_7$ as part of the query evaluation method.

DETAILED DESCRIPTION

Figure 2:
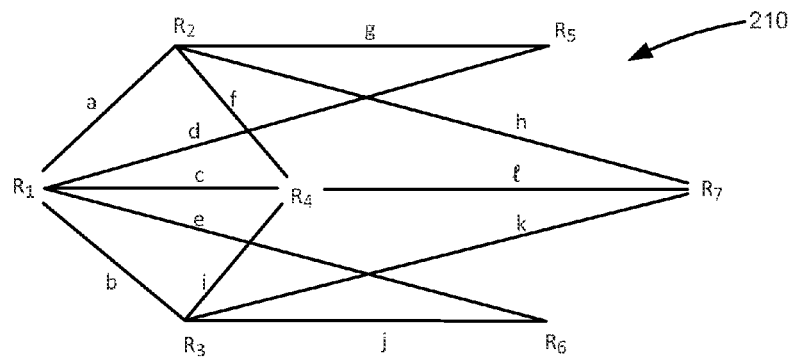
FIG. 2 is a block diagram illustrating a join graph representing a first part of join query 140.

Embodiments of techniques for join tuple assembly by partial specializations are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

FIG. 1 is a block diagram illustrating a number of exemplary relations. FIGS. 1-5 present an example of a method for query evaluation with the purpose to illustrate the basic steps of this method and provide general knowledge in this area without showing specific details. FIG. 1 includes the following exemplary relations: $R_1$ 105, $R_2$ 110, $R_3$ 115, $R_4$ 120, $R_5$ 125, $R_6$ 130, and $R_7$ 135. All relations include a set of attributes heading their columns (e.g., a, b, c, etc.) and a set of row identifiers heading the rows of the tables. All attributes in the exemplary relations are of integer type. The column in a relation headed by the relations name $R_n$ (in the example, n = 1 ... 7) always contains the row identifiers. The row identifiers are consecutive integers that are unique within their relation. The function of a row identifier is to identify a row within its table. The relations $R_1$ 105, $R_2$ 110, $R_3$ 115, $R_4$ 120, $R_5$ 125, $R_6$ 130, and $R_7$ 135 represent coded data in the form of integer values.

A method of query evaluation by semi-join reduction is applied to the following query using the relations $R_1$ 105, $R_2$ 110, $R_3$ 115, $R_4$ 120, $R_5$ 125, $R_6$ 130, and $R_7$ 135:

TABLE 1

Join query (140)

| | |
|---|---|
| SELECT | $R_1.z + R_2.z + R_3.z + R_4.z + R_5.z + R_6.z + R_7.z$ |
| FROM | $R_1, R_2, R_3, R_4, R_5, R_6, R_7$ |
| WHERE | $R_1.a = R_2.a$ AND |
| | $R_1.b = R_3.b$ AND |
| | $R_1.c = R_4.c$ AND |
| | $R_1.d = R_5.d$ AND |
| | $R_1.e = R_6.e$ AND |
| | $R_2.f = R_4.f$ AND |
| | $R_2.g = R_5.g$ AND |
| | $R_2.h = R_7.h$ AND |
| | $R_3.i = R_4.i$ AND |
| | $R_3.j = R_6.j$ AND |
| | $R_3.k = R_7.k$ AND |
| | $R_4.l = R_7.l$ AND |
| | $(R_1.z)^2 + (R_2.z)^2 + (R_3.z)^2 + (R_4.z)^2 + (R_5.z)^2 + (R_6.z)^2 + (R_7.z)^2 <= 1000$ AND |
| | $((R_1.z * R_2.z * R_3.z * R_4.z >= 1000)$ OR $(R_1.z * R_2.z * R_3.z * R_4.z = 0))$ |

Table 1 shows an example of a join query 140 based on the relations $R_1$ 105, $R_2$ 110, $R_3$ 115, $R_4$ 120, $R_5$ 125, $R_6$ 130, and $R_7$ 135. The SELECT statement defines what data to be retrieved. In the example, there is only one expression, but this expression references attributes from all seven tables. For simplicity, all these attributes are named as "z". The FROM clause defines which relations are necessary to evaluate the join query 140. The WHERE clause includes one or more conditions that have to be fulfilled. Some of these conditions (in the example, all conditions except the last one) are join conditions, making the query a join query. Join query 140 will join relations $R_1$ 105, $R_2$ 110, $R_3$ 115, $R_4$ 120, $R_5$ 125, $R_6$ 130, and $R_7$ 135 using the corresponding columns specified in the WHERE clause. For example, the first condition of the WHERE clause is $R_1 \cdot a = R_2 \cdot a$, which means that columns with attribute "a" from relations $R_1$ 105 and $R_2$ 110 will be joined. This means that in every 7-tuple $(r_1, r_2, r_3, r_4, r_5, r_6, r_7) \in R_1 \times R_2 \times R_3 \times R_4 \times R_5 \times R_6 \times R_7$ satisfying the complete WHERE clause, the values in the "a" columns of $R_1$ and $R_2$ must be equal. Analogously, this is valid for the remaining join conditions of the WHERE clause.

All joins in join query 140 are inner joins. An inner join is a common join operation used in applications and represents the default join type. The inner join creates a new result table by combining column values of two tables (A and B) based upon a join predicate. However, the method can also be applied to left outer joins, right outer joins, and full outer joins. An outer join does not require each record in the two joined tables to have a matching record. The joined table retains each record, even if no other matching record exists. The result of a left outer join (or simply "left join") of table A with table B always contains all records of the "left" table (A), even if the join condition does not find any matching record in the "right" table (B). A right outer join (or "right join") closely resembles a left outer join, except with the treatment of the tables reversed. A full outer join combines the results of both left and right outer joins.

FIG. 2 is a block diagram illustrating a join graph representing a first part of join query 140. Join graph (JG) 210 represents the join part of the WHERE clause of join query 140. Join graph 210 includes all relations $R_1$ 105, $R_2$ 110, $R_3$ 115, $R_4$ 120, $R_5$ 125, $R_6$ 130, and $R_7$ 135 as vertices of the graph. Join graph 210 also includes edges between any two of the relations exactly if there is a join condition joining them (in the join part of the WHERE clause of join query 140). Since all join conditions are simple equality conditions on equally named attributes, the respective join condition can be identified by placing its common attribute name on top of the respective edge. For example, since the join condition between relation $R_1$ 105 and $R_2$ 110 is based on the attribute "a" ($R_1 \cdot a = R_2 \cdot a$), the edge between $R_1$ and $R_2$ is identified with "a".

Figure 3:
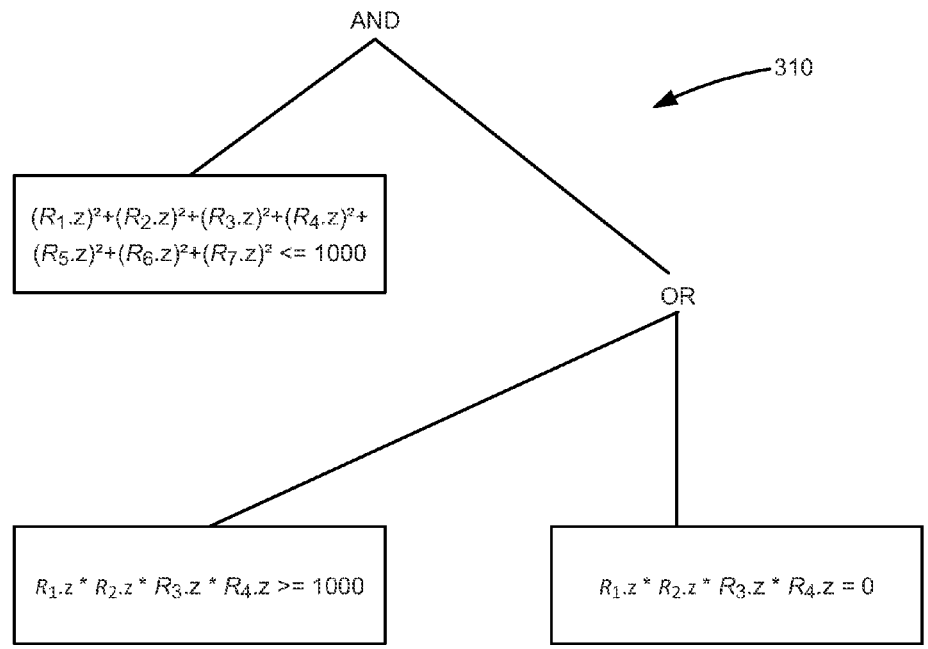
FIG. 3 is a block diagram illustrating an operator tree representing a second part of join query 140.

FIG. 3 is a block diagram illustrating an operator tree representing a second part of join query 140. The WHERE clause of the join query 140 may also contain additional conditions that are not join conditions. In the example, there is only one such condition:

$$\Gamma = (R_1 \cdot z)^2 + (R_2 \cdot z)^2 + (R_3 \cdot z)^2 + (R_4 \cdot z)^2 + (R_5 \cdot z)^2 + (R_6 \cdot z)^2 + (R_7 \cdot z)^2 <= 1000$$

AND $$((R_1 \cdot z * R_2 \cdot z * R_3 \cdot z * R_4 \cdot z >= 1000) \text{ OR } (R_1 \cdot z * R_2 \cdot z * R_3 \cdot z * R_4 \cdot z = 0))$$

Operator tree 310 represents the non-join conditions ($\Gamma$) graphically.

The method of query evaluation by semi-join reduction applied to the join query 140 should result in a set of join tuples. Every join tuple is a 7-tuple $(r_1, r_2, r_3, r_4, r_5, r_6, r_7)$ where $r_1$ is a join tuple $R_1$ 105, $r_2$ in $R_2$ 110, $r_3$ in $R_3$ 115, $r_4$ in $R_4$ 120, $r_5$ in $R_5$ 125, $r_6$ in $R_6$ 130, and $r_7$ in $R_7$ 135. Every such 7-tuple has to satisfy both the join conditions, assembled in the join graph 210, and the non-join conditions, assembled in the operator tree 310.

FIG. 4 is a block diagram illustrating the reduced relations $R_1$, $R_2$, $R_3$, $R_4$, $R_5$, $R_6$, and $R_7$ as part of the query evaluation method. The first step of the method of query evaluation by semi-join reduction consists of recursively eliminating from all relations of the join, all rows for which there is a join condition in which they have no join partner. Eliminating one row can result in other rows losing some or all join partners. Following the join conditions of the join part of the WHERE clause of the join query 140 and thus recursively eliminating the rows with no join partner, the relations $R_1$ 105, $R_2$ 110, $R_3$ 115, $R_4$ 120, $R_5$ 125, $R_6$ 130, and $R_7$ 135 are reduced to relations $R_1$ 405, $R_2$ 410, $R_3$ 415, $R_4$ 420, $R_5$ 425, $R_6$ 430, and $R_7$ 435.

The second step of the method of query evaluation by semi-join reduction is join tuple assembly. Its purpose is to construct all 7-tuples $(r_1, r_2, r_3, r_4, r_5, r_6, r_7) \in R_1 \times R_2 \times R_3 \times R_4 \times R_5 \times R_6 \times R_7$ satisfying the complete WHERE clause of the SELECT statement, or at least the needed number of 7-tuples, if the query was a first-k query. A first k-query is a query, where the size of the result is limited by the user, for example, the user may specify: "return only the first 20 rows of the result". For the join tuple assembly phase, a materialization graph (MG) is constructed. The MG will be used to construct the join tuples satisfying the complete WHERE clause.

Figure 5:
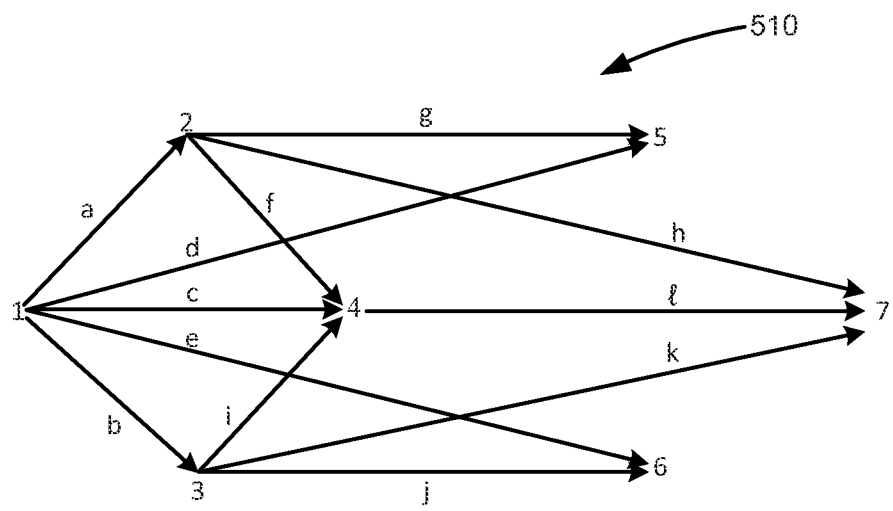
FIG. 5 is a block diagram illustrating a materialization graph according to the join tuple assembly phase.

FIG. 5 is a block diagram illustrating a materialization graph according to the join tuple assembly phase. For constructing the MG 510, first the set of vertices of the MG 510 is determined. The set is always a subset of the vertices of the JG 210, it contains all relations referenced in the SELECT clause and the operator tree r. According to the example, all nodes of the join graph 210 are also nodes of the MG 510. The next step of the join tuple assembly is to make this set into a sequence, representing the order of materialization. One arbitrary possibility for join tuple construction is to start with a row $r_3$ in the reduced relation $R_3$, giving a 1-tuple $(r_3)$, to prolong it by a row $r_6$ in the reduced relation $R_6$ satisfying the join between $R_3$ and $R_6$:$r_3 \cdot j$ giving a 2-tuple $(r_3, r_6)$, to prolong it by a row $r_7$ in the reduced relation $R_7$ satisfying the join between $R_3$ and $R_7$:$r_3 \cdot k = r_7 \cdot k$ giving a 3-tuple $(r_3, r_6, r_7)$, and so on. Another arbitrary possibility would be to start with an $r_4 \in R_4$, prolong by a suitable $r_2 \in R_2$, prolong by a suitable $r_7 \in R_7$, where suitable means to satisfy the two simultaneous conditions: $r_4 \cdot l = r_7 \cdot l$ and $r_2 \cdot h = r_7 \cdot h$, and so on.

In general, the choice of a good materialization sequence is an optimization issue. For simplicity reasons, the natural order $R_1$, $R_2$, $R_3$, $R_4$, $R_5$, $R_6$, $R_7$ is used in the example. The sequence chosen is represented in the materialization graph 510 by relabeling its vertices by their position in this sequence. For example, $R_1$ is relabeled as 1, $R_2$ relabeled as 2, and so on. If the materialization sequence was chosen to be $R_5$, $R_2$, $R_4$, $R_7$, $R_1$, $R_6$, $R_3$, then the vertices would be relabeled in the following way: $R_1$ as 5, $R_2$ as 2, $R_3$ as 7 and so on. Additionally, the edges in MG 510 are given a direction. The edges are made arrows, pointing from lower numbered tail to higher numbered head. For example, arrow "a" points from 1 to 2, where 1 is the tail of the arrow and 2 is the head of the arrow.

The query evaluation by semi-join reduction is complete when all join tuples are assembled, meaning that all 7-tuples $(r_1, r_2, r_3, r_4, r_5, r_6, r_7) \in R_1 \times R_2 \times R_3 \times R_4 \times R_5 \times R_6 \times R_7$ satisfying the complete WHERE clause of the SELECT statement are known. For example, the 7-tuple $(r_1=3, r_2=5, r_3=2, r_4=4, r_5=3, r_6=1, r_7=1)$, or just (3, 5, 2, 4, 3, 1, 1), satisfies the WHERE clause of join query 140. This can be verified in the following way: first, the join condition $r_1 \cdot a = r_2 \cdot a$ is checked for the rows $r_1=3$ and $r_2=5$. Looking into the reduced relations $R_1$ 405 and $R_2$ 410, since $r_1=3$, the row identifier for $R_1$ 405 is "3", which corresponds to the second row in table 405. Looking at the second row of table 405 and at the "a" attribute, it shows that $r_1 \cdot a = 3$. Again, looking at the reduced relations $R_1$ 405 and $R_2$ 410, since $r_2=5$, the row identifier for $R_2$ 410 is "5", which corresponds to the second row in table 410. Looking at the second row of table 405 and at the "a" attribute, it shows that $r_2 \cdot a = 3$. Therefore, $r_1 \cdot a = 3 = r_2 \cdot a$. The following list shows the verification of all join conditions of the WHERE clause on the 7-tuple given above.

$r_1.a = 3 = r_2.a$,
$r_1.b = 6 = r_3.b$,
$r_1.c = 9 = r_4.c$,
$r_1.d = 12 = r_5.d$,
$r_1.e = 15 = r_6.e$,
$r_2.f = 14 = r_4.f$,
$r_2.g = 9 = r_5.g$,
$r_2.h = 10 = r_7.h$,
$r_3.i = 16 = r_4.i$,
$r_3.j = 15 = r_6.j$,
$r_3.k = 1 = r_7.k$,
$r_4.l = 20 = r_7.l$

In addition to satisfying the join part of the WHERE clause, the 7-tuple should also satisfy the remaining non-join condition:

$$\Gamma = (R_1 \cdot z)^2 + (R_2 \cdot z)^2 + (R_3 \cdot z)^2 + (R_4 \cdot z)^2 + (R_5 \cdot z)^2 + (R_6 \cdot z)^2 + (R_7 \cdot z)^2 <= 1000$$

AND $$((R_1 \cdot z * R_2 \cdot z * R_3 \cdot z * R_4 \cdot z >= 1000) \text{ OR } (R_1 \cdot z * R_2 \cdot z * R_3 \cdot z * R_4 \cdot z = 0))$$

For the 7-tuple (3, 5, 2, 4, 3, 1, 1), it can be checked that: $r_1 \cdot z = 10$, $r_2 \cdot z = 0$, $r_3 \cdot z = 12$, $r_4 \cdot z = 12$, $r_5 \cdot z = 4$, $r_6 \cdot z = 20$, $r_7 \cdot z = 14$. Then:

$$10^2 + 0^2 + 12^2 + 12^2 4^2 + 20^2 + 14^2 = 1000$$

AND $$10 * 0 * 12 * 12 = 0$$

The first condition in $\Gamma$ is satisfied (since 1000 is $<=1000$) and the second condition is also satisfied (by the OR part, since 0 is equal to 0). Thus, the 7-tuple satisfies the complete WHERE clause. After this verification, it is still not evident how many tuples there are in total satisfying the WHERE clause, but for the current example query there is at least one. In general, there could be no such tuple at all or any number of them, up to the product of the cardinalities of the base relations.

Let J be the number of join tuples of the current example. If only the base relations in FIG. 1 are known, only the basic estimation $0 <= J <= 5^7 = 78.125$ is possible, since there are 7 relations, each having 5 rows. When the reduced relations of FIG. 4 are known, this estimation can be improved to $0 <= J <= 2^6 * 4 = 256$, since now 6 relations have cardinality 2 and 1 relation has cardinality 4. Taking into account that with (3, 5, 2, 4, 3, 1, 1) at least one join tuple was just presented, the latter estimation can still be improved to $1 <= J <= 2.56$.

When all join tuples are constructed, their attributes referenced in the SELECT clause are fetched and the final answer is computed. For example, corresponding to the 7-tuple (3, 5, 2, 4, 3, 1, 1), these are just the z-values from which their sum is computed: 10+0+12+12+4+20+14=72. "72" is therefore one element of the result returned by the query.

As mentioned above, FIGS. 1-5 present an example of the method for query evaluation by semi-join reduction. The query evaluation method includes several steps, among which is the join tuple assembly. The standard techniques first construct all tuples satisfying the join part of the WHERE clause, then select from these tuples those that additionally satisfy the non-join conditions. This construction is expensive with respect to time and memory consumption. Depending on the data and the topology of the join graph (e.g., cyclic joins), certain obstacles can occur such as: 1) perfect reduction of tables to the projections of the join, by semi-joins alone, is challenged; and 2) to flatten the join graph in the reduction phase into a tree by duplicating vertices leads to practical inefficiencies when afterwards, in the assembly phase, one has to secure the identity of the join tuple entries at the positions of the duplicated nodes. In these cases, and also in the presence of non-join conditions that can only be evaluated on the already evaluated join, it is common in practice that the phase of join tuple assembly is the one consuming most of the computation time and/or the phase with the highest memory consumption.

Embodiments of techniques for a join tuple assembly algorithm by partial specializations are described herein. For simplicity reasons, the algorithm for a join tuple assembly is described using parts of the example introduced with FIGS. 1-5. In an embodiment, the algorithm is applied on a join query (e.g., join query 140). The WHERE clause is divided into a join part and a non-join part. The join part can be visualized as a join graph (e.g., JG 210) and the non-join part can be visualized as an operator tree (e.g., operator tree 310). The join tuples to be constructed should also satisfy the condition represented by the operator tree (i.e., Γ). In the operator tree, the inner nodes are Boolean operators and the leaves are certain terms. Every term references some subset of the base relations $R_1, R_2, \ldots, R_7$ of the join.

A materialization graph G=(V, A), where "V" is a set of vertices and "A" is a set of arrows, has been built that in general corresponds to a subgraph of the join graph. In the example, MG 510 corresponds to the full join graph. In general, the materialization graph G is a directed graph on the vertex set $V=\{1, 2, 3 \ldots N\}$, where $N \in \mathbb{N}$. In general, every vertex n represents one base relation $R_m$ of the join graph (e.g., JG 210). In the materialization graph G, the relations are renamed as in MG 510. In the current example, $R_1$ is 1, $R_2$ is 2, and so on. Here, every arrow $a \in A$, $$m \xrightarrow{a} n$$

represents a join condition between the relations $R_m$ and $R_n$, inherited from the join graph. The expression $$"m \xrightarrow{a} n"$$

specifies that there is an arrow pointing from $R_m$ to $R_n$. In the materialization graph G, there are no parallel arrows. This means that there is at most one arrow between any two relations. In addition, the arrows are ascending. This means that for all arrows $a \in A$, where $$m \xrightarrow{a} n$$

and n, m∈V, m is less than n (m<n). As mentioned before, m specifies the tail of tire arrow and n specifies the head of the arrow. Further, for all vertices n∈N, there is at least one directed path in G from 1 to n.

In an embodiment, the underlying join graph part (including a set of vertices V and a set of edges E, where the set of edges E is obtained from a set of arrows A but without a direction) may contain undirected cycles, but not loops (cycles of length 1). Also, every full subgraph G'=G∩{1, 2, ..., n}, 1<=n<=N of G has the same properties as G. A subgraph G' of a graph G is called full, if all edges in G connecting vertices in G' are also edges in G'. Similarly to G, G' is a directed acyclic graph with ascending arrows, it has exactly one source, and for all vertices v∈G', that is, for 1<=v<=n, there is at least one directed path in G' from 1 to v.

In an embodiment, for every arrow a∈A, a head h and a tail t are defined. If an arrow a is $$m \xrightarrow{a} n,$$

then h(a)=n and t(a)=m, which means that the head of the arrow a is defined with m and the tail of the arrow a is defined with n. This definition can be extended to arbitrary non-empty paths in G. A path of length 1 in G is either an arrow a∈A or an inverse arrow $a^{-1}$. For example, if $$m \xrightarrow{a} n,$$

then $$m \xleftarrow{a^{-1}} n,$$

so $h(a^{-1})=m$ and $t(a^{-1})=n$. This means that $a^{-1}$ is the arrow obtained from a by reversing the orientation. A path p of length $r \in \mathbb{N}$ in G is a sequence of the type: $p=a_1 a_2 \ldots a_r$, such that every $a_i$, where $1<=i<=r$, is a path of length 1, such that these paths have to be composable, which means: for $1<=i<r$: $h(a_i)=t(a_{i+1})$. Head and tail of the path p are: $h(p)=h(a_r)$ and $t(p)=t(a_1)$.

Figure 6:
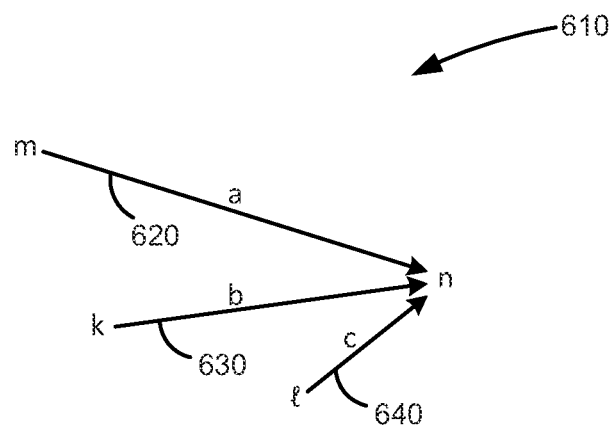
FIG. 6 is a block diagram illustrating a part of a materialization graph according to an embodiment.

FIG. 6 is a block diagram illustrating a part of a materialization graph according to an embodiment. Graph part 610 includes a set of arrows: a 620, b 630, and c 640. Arrow a 620 has a head n and tail m; arrow b 630 has a head n and tail k; and arrow c 640 also has a head n and tail l. Let also assume that m<k<l<n. In an embodiment, every arrow has at most one successor. A successor of an arrow is another arrow that has the same head as the first arrow, but has the next higher tail. For example, in FIG. 6, a 620 and b 630 have a successor, c 640 has no successor. The successor of a 620 is and b 630, the successor of and b 630 is c 640. c 640 is not the successor of a 620, since b 630 is between them. This can be written as S(a)={b}, S(b)={c}, and S(c)=φ.

In an embodiment, an arrow has at most one predecessor. A predecessor of an arrow is another arrow that has the same head as the first arrow, but the next lower tail. In the same example, c 640 has a predecessor, namely b 630, and b 630 also has a predecessor, namely a 620, whereas a 620 has no predecessor. a 620 is not the predecessor of c 640 since b 630 is between them. This can be written as P(c)={b}, P(b)={a} and P(a)=φ.

In an embodiment, matching sets from the reduction of the full relations $R_1$ 105, $R_2$ 110, $R_3$ 115, $R_4$ 120, $R_5$ 125, $R_6$ 130, and $R_7$ 135 are defined as part of the algorithm for join tuple assembly by partial specializations. For every vertex n∈V, the matching set $M_{n,0} \subseteq R_n$ is the reduction result of the full table $R_n$. Additionally, for every arrow a∈A, $$m \xrightarrow{a} n,$$

there will be a matching set $M_a \subseteq R_n$. Further, for every arrow a∈A, $$m \xrightarrow{a} n,$$

that has a successor: Sa(a)={b}, $$k \xrightarrow{b} n,$$

there will be a matching set $M_{ab}^{-1} \subseteq R_k$. The matching sets (i.e., $M_{n,0}$, $M_a$, $M_{ab}^{-1}$) are different as objects, meaning that their definitions will differ, but some of them may contain identical elements.

In an embodiment, the collection of all matching sets is defined as M. M contains exactly |V| sets of the form $M_{n,0}$, exactly |A| sets of the form $M_a$, and at most |A| sets of the form $M_{ab}^{-1}$. Further, M contains at least one set of the form $M_{ab}^{-1}$ exactly when the materialization graph G contains unoriented cycles.

The definition of the matching sets also includes defining the head and tail functions on M (as so far, these are defined only for paths in G). In an embodiment, M∈M is a matching set of the form $M_{n,0}$, $M_a$, or $M_{ab}^{-1}$. If $M=M_{n,0}$ for some vertex n∈V, then $h(M_{n,0})=n$ and $t(M_{n,0})=0$. If $M=M_c$ for some path c=a (or $c=ab^{-1}$) in G, then $h(M_c)=h(c)$ and $t(M_c)=t(c)$. These definitions lead to the following two consequences: 1) for every matching set M there is $M \subseteq R_n$, where n=h(M); and 2) for any n∈V there are matching sets (M∈M) with t(M)=n exactly when n is not a sink (a vertex of a directed graph with no outgoing arrows) in G.

In an embodiment, the above described head and tail functions on M are used to define an ordering on M. First, the tail function is applied: for all M, M'∈M:t(M)<t(M')⇒ M before M'. This means that if the tail of matching set M is lower than the tail of matching set M', then M is ordered before M'. Having ordered the matching sets with unequal tails, the matching sets of equal tail remain to be ordered. This is first done for the case of two matching sets that both have tail "0": For all 1<=m<n<=N, $M_{m,0}$ is ordered before $M_{n,0}$.

Then, two matching sets having a common tail t are ordered, where 1<=t<=N. For this purpose, let $$t \xrightarrow{a_1} n_1, t \xrightarrow{a_2} n_2, \ldots, t \xrightarrow{a_S} n_S$$

be all arrows starting at tail t and ending at heads $n_1, n_2, \ldots, n_S$, where $n_1 < n_2 < \ldots < n_S$. The corresponding matching sets $M_{a1}, \ldots, M_{as}$ are ordered in the following way: $M_{a1}$ before $M_{a2}$ before $M_{a3} \ldots$ before $M_{as}$. Additionally, if there are matching sets of the type $M_{ab}^{-1}$ (this is, if arrow a has as a successor arrow b) their position is set in the following way: $M_{ab}^{-1}$ immediately after $M_a$.

In another embodiment, the set M of all matching sets is subdivided using the head function for every vertex n∈V, let $M_n=\{M \in M: h(M)=n\} \subseteq M$. Then, $M=M_1 \cup M_2 \cup \ldots \cup M_n$. This means that $M_n$ is a subset of matching sets from the collection M that have the same head and M is their disjoint union. Since M is already ordered, every subset $M_n$ of M is also ordered. Thus, it remains to make this ordering of $M_n$ explicit: for all M, M'∈$M_n$:t(M)<t(M')⇒ M is place before M'. Since the head of the matching sets M and M' is the same (i.e., n), then the tails of the matching sets are compared. If they are different, the matching set with the lower tail is placed first (in this case, matching set M) in the ordering. $M_n$ always contains the matching set $M_{n,0}$ (where h ($M_{n,0}$)=n and $t(M_{n,0})=0$), which is placed first in $M_n$.

The ordering of $M_n$ is to be made explicit for matching sets of equal tails. This is done for all matching sets M∈$M_n$ having t(M)=t, where t is a fixed value with 1<=t<N. These matching sets can be obtained as follows: there is an arrow a∈A, $$t \xrightarrow{a} k$$

k for some vertex k∈V, where k>=n. If k=n, then $M=M_a$. If k>n, then the successor of arrow a is some arrow b∈A, $$n \xrightarrow{b} k$$

and $M=M_{ab}^{-1}$. These sets M are ordered by increasing k. For example, if $$t \xrightarrow{a} k$$

leads to a matching set M (i.e., $M=M_a$ or $M=M_{ab}^{-1}$) and $$t \xrightarrow{a'} k'$$

leads to a different matching set M'(M≠M'), then k≠k'. Further, if k<k', then matching set M is placed before matching set M'. If in some embodiments, the materialization graph G has a direct arrow $$t \xrightarrow{a} n,$$

the matching set $M_a \in M_n$ is placed first among all matching sets M∈$_n$ with tail t(M)=t.

The ordering in $M_n$ can be written as: $M_n=\{M_{n,0}, M_{n,1}, M_{n,2}, \ldots, M_{n,r}\}$, r∈$N_0$, where $M_{n,0}$ is placed before $M_{n,1}$, which is placed before $M_{n,2}$ and so on till $M_{n,r}$. This expression provides the matching sets M, which have the form $M=M_c$ for some path c=a (or $c=ab^{-1}$), with an additional name $M=M_{n,i}$, where i>0 represents their position in the ordered collection $M_n$. These matching sets can be referred as "higher matching sets". The first matching set, $M_{n,0}$, is the matching set already defined above as reduction result of relation $R_n$. $M_{n,0}$ is always placed first in $M_n$. The ordered collection $M_n$ has some properties including: 1) $M_{n,0} \in M_n$ for all n∈V; and 2) $|M_n|>1$ for all n>1.

In an embodiment, the matching sets $M_{n,i}$ form a descending chain (for any fixed n∈V) of the type: $R_n \supseteq M_{n,0} \supseteq M_{n,1} \supseteq M_{n,2} \supseteq \ldots \supseteq M_{n,r}$, where r∈$N_0$. The descending order of this chain comes from the fact that their members satisfy successively more conditions that are necessary to qualify as the next element in a join tuple construction process. Elements for the construction process will only be taken from the last smallest set $M_{n,r}$, but the intermediate chain members $M_{n,i}$ also represent valuable information. This information can be reused without being recomputed and accelerates the entire tuple construction process.

In an embodiment, every matching set defined as part of the algorithm for join tuple assembly by partial specializations depends on some t-tuple $(r_1, r_2, \ldots, r_t) \in R_1 \times R_2 \times \ldots \times R_t$, for $0 <= t < N$. This means that the tuple $(r_1, r_2, \ldots, r_t)$ is needed for M to be defined. The dependency of the matching sets on tuples can be described abstractly in the following way: when M depends on $(r_1, r_2, \ldots, r_t)$, this could be any tuple in $R_1 \times R_2 \times \ldots \times R_t$. When executing the join tuple algorithm, the tuples $(r_1, r_2, \ldots, r_t)$ that occur in this context will be no longer arbitrary—they occur during the algorithm as valid join tuples for some subgraph of G that are in the process to be completed to a full N-tuple $(r_1, r_2, \ldots, r_N) \in R_1 \times R_2 \times \ldots \times R_N$, satisfying the complete WHERE clause.

The matching sets are defined recursively in the order of M. The induction basis is formed by the reduction results $M_{1,0}, \ldots, M_{N,0}$, which are already defined and ordered first in M. In the ordering of M, let M be the first matching set that is yet undefined. In an embodiment, the first case is considered that $M = M_a$ for some arrow $$t \xrightarrow{a} n, a \in A.$$

At the same time, there is the alternative naming of the same set as $M = M_{n,i}$ for some $i > 0$, hence $M = M_{n,i} \subseteq R_n$. The matching set $M_{n,i-1}$ ($M_{n,i-1} \subseteq R_n$) is ordered before $M_{n,i}$, so it has already been defined. This can be used to define $M: M = M_a = M_{n,i} = M_{n,i-1} \cap a(r_t)$. The set $a(r_t)$ is the subset of $R_n$ that matches the given element $r_t$ of (N−1)-tuple $(r_1, r_2, \ldots, r_{N-1}) \in R_1 \times R_2 \times \ldots \times R_{N-1}$, with respect to the join condition $a: a(r_t) = \{x \in R_n : a(r_1, x) = \text{True}\} \subseteq R_n$. Hence, M can be defined as: $M = M_a = M_{n,i} = \{x \in M_{n,i-1} : a(r_1, x) = \text{True}\} \subseteq M_{n,i-1} \subseteq R_n$. This means that the process sifts through the matching set $M_{n,i-1}$ and selects those elements that match $r_t$ under a.

In another embodiment, the first yet undefined matching set M has the form: $M = M_{ab}^{-1}$ for some arrow $$t \xrightarrow{a} n,$$

$a \in A$ as above, and an arrow $$k \xrightarrow{b} n,$$

where $S(a) = \{b\}$. Similarly, there is an alternative naming of the same set as $M = M_{k,i}$ for some $i > 0$, and hence $M = M_{k,i} \subseteq R_k$. In the ordering of the collection of matching sets M, matching set $M_a$ is placed before $M_{ab}^{-1}$. Therefore, both matching sets $M_a$ and $M_{k,i-1}$ are already defined. This can be used to define $M: M = M_a = M_{ab}^{-1} = M_{k,i} = M_{k,i-1} \cap b^{-1}(M_a)$. The set $b^{-1}(M_a)$ is the subset of $R_k$ that matches at least one element of $M_a$ with respect to the join condition $b: b^{-1}(M_a) = \{x \in R_k: \text{there is a row } y \in M_a \text{ such that } b(x,y) = \text{True}\} \subseteq R_k$. Again, this means that the process sifts through $M_{k,i-1}$ using the join condition b.

In an embodiment, let $\Gamma$ be an operator tree, such as operator tree 310 and $1 <= n <= N$, and $r_n \in R_n$ are given. $\Gamma(r_n)$, the specialization of $\Gamma$ by $r_n$, is an operator tree obtained from $\Gamma$ as follows: into any term in $\Gamma$ (all terms are at the leaf positions of the tree) that references the relation $R_n$, the value $r_n$ is substituted for the variable $R_n$. Thus, all terms are specialized, resulting in new terms not referencing $R_n$. Some of the new terms may even become constant, this is, identical to True of False. Further, the specialization includes obtaining all constant terms from the operator tree that are not in a root position. Then, the Boolean values of the constant terms are propagated upwards through the nodes of the operator tree $\Gamma$. This leads to further operator tree nodes becoming constant. $\Gamma(r_n)$ is the result of this specialization process of $\Gamma$.

In an embodiment, $\Gamma$ is the operator tree (e.g., operator tree 310) representing those conditions of a join query that are not join conditions (and cannot be evaluated before the join has been evaluated). For any N-tuple $(r_1, r_2, \ldots, r_N) \in R_1 \times R_2 \times \ldots \times R_N$, a sequence of successive partial specializations of $\Gamma$ may be defined as follows: let $\Gamma_0 = \Gamma$, $\Gamma_1 = \Gamma_0(r_1)$, $\Gamma_2 = \Gamma_1(r_2), \ldots, \Gamma_N = \Gamma_{N-1}(r_N)$. In this case, $\Gamma_N$, the full specialization of $\Gamma$, is either True or False, at the latest. In an embodiment, if some previous specialization $\Gamma_n$ has already been constant, then all specializations that follow $\Gamma_n$ are identical to it and are constant.

The above definitions present matching sets of the form $M_{ab}^{-1}$ only in the case where there are two arrows $a, b \in A$ and the successor of arrow a is arrow b: $S(a) = \{b\}$. If arrow a has a tail m and a head n, $$m \xrightarrow{a} n,$$

and arrow b has a tail k and also a head n $$k \xrightarrow{b} n,$$

then $h(ab^{-1}) = k > m = t(ab^{-1})$. If the matching sets $M_{ab}^{-1}$ were presented for all arrows $a, b \in A$ with $h(a) = h(b)$ and $t(a) < t(b)$ so that $h(ab^{-1}) = t(b) > t(a) = t(ab^{-1})$, then the computation of the sets $M_{ab}^{-1}$ with $b \notin S(a)$ would have been redundant.

If an (N−1)-tuple $(r_1, r_2, \ldots, r_{N-1}) \in R_1 \times R_2 \times \ldots \times R_{N-1}$ is provided and a matching set $M \in \mathcal{M}$ with $0 <= t = t(M) < N$ has been defined as above, then: 1) M does not depend on $r_{t+1}, \ldots, r_{N-1}$; and 2) if $t > 0$, then M depends on $r_t$.

In an embodiment, memory consumption can be greatly reduced by not explicitly storing all matching sets $M_{n,i}$ of the following descending chain: $R_n \supseteq M_{n,0} \supseteq M_{n,1} \supseteq M_{n,2} \supseteq \ldots \supseteq M_{n,r}$, where $r \in N_0$, pertaining to some fixed vertex $n \in V$. It is enough to store $M_{n,0}$ and together with every element x ($x \in M_{n,0}$), an integer i ($0 <= i <= r$), which interpretation is: 1) $x \in M_{n,i}$, $x \notin M_{n,i+1}$, if $0 <= i < r$, and 2) $x \in M_{n,r}$, if $i = r$.

Additionally, the computation of matching sets can be further decreased. Let $M \in \mathcal{M}$ be a matching set and $t = t(M)$, where M depends at most on $r_1, r_2, \ldots, r_t$. If M has been first computed for some t-tuple $(r_1, r_2, \ldots, r_t)$ and is later needed for a different t-tuple $(r_1', r_2', \ldots, r_t')$, then the attribute values of the rows of the relations that entered the computation from both t-tuples are compared and it is checked if these attribute values are the same on $(r_1', r_2', \ldots, r_t')$ as they were on $(r_1, r_2, \ldots, r_t)$. If they agree, M does not need to be recomputed, although $(r_1, r_2, \ldots, r_t)$ changed. This leads to one more decrease in recomputation since repeated attribute values are quite common in practice.

Figure 7:
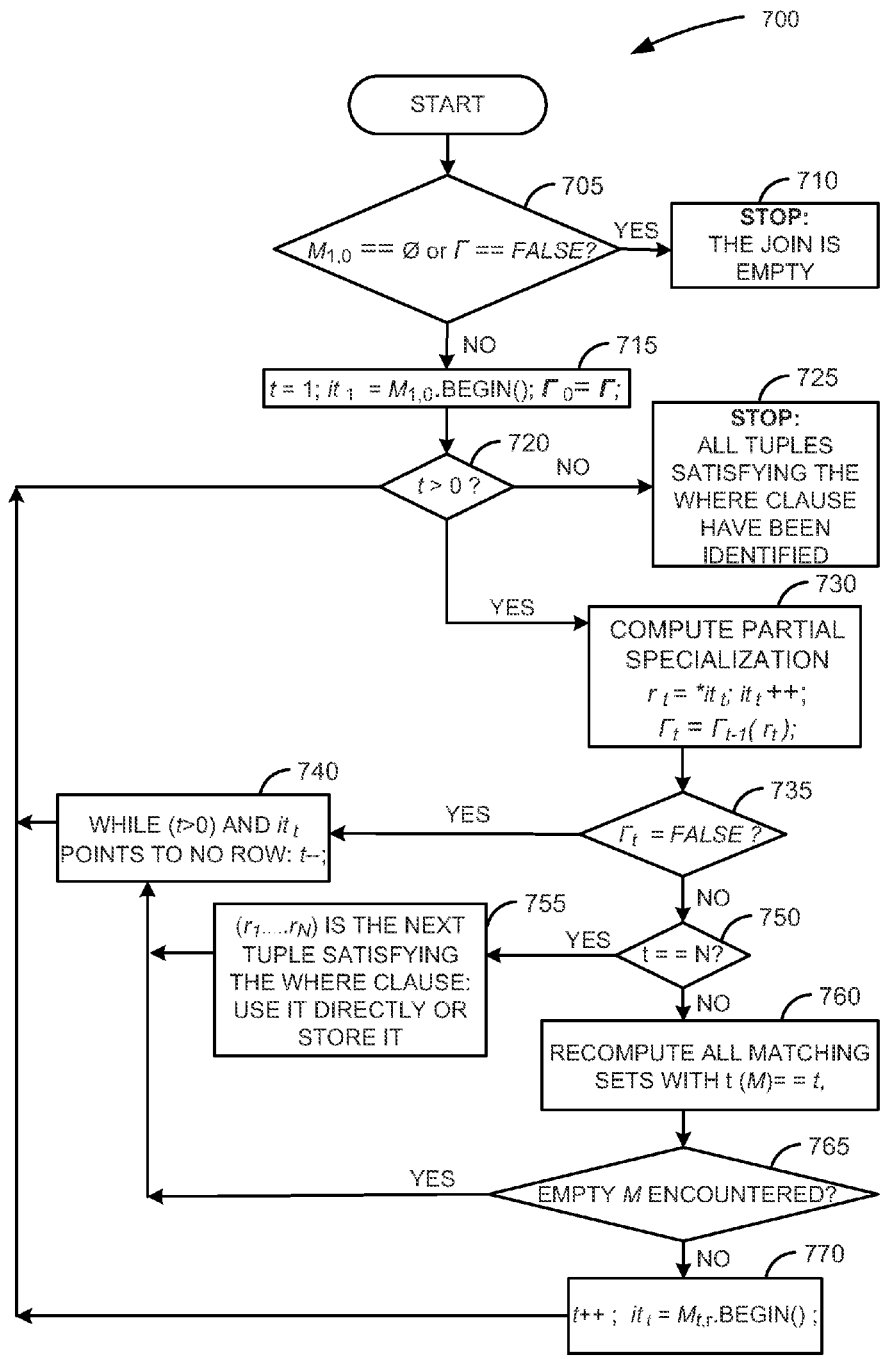
FIG. 7 is a flow diagram of an embodiment of a method for join tuple assembly by partial specializations.

FIG. 7 is a flow diagram illustrating an embodiment of a method for join tuple assembly by partial specializations. Algorithm 700 is applied to a join query, such as join query 140, including join and non-join conditions in the WHERE clause. The non-join conditions are presented as an operator tree, such as Γ 310. In addition, a materialization graph G is built (e.g., materialization graph 510) and the matching sets $M_{1,0}, \ldots, M_{N,0}$ of the reduction results of the full relations are provided. The materialization graph G is a subgraph of the join graph such as join graph 210. At decision block 705, the algorithm checks if one of the reduction results $M_{n,0}$ is empty or if the operator tree Γ equals the constant expression False. If the result from decision block 705 is "yes", then the algorithm stops at block 710 as the join is empty. If the result from decision block 705 is "NO", then the algorithm continues at block 715.

At block 715, a defined number of initializations are performed. In an embodiment, the initializations include the following elements: 1) a tuple construction counter t; 2) an iterator $it_1$; and 3) a trivial partial specialization $\Gamma_0$ of the operator tree Γ. The tuple construction counter t indicates how far the algorithm 700 has proceeded in building one more join tuple. For example, if the relations are seven in number, then 7-tuples $(r_1, r_2, \ldots, r_7)$ are to be generated and the counter t indicates how far the construction of the current tuple has gone. For example, if t=3, this means that a 2-tuple $(r_1, r_2)$ has been identified and constructed that can be completed to a 7-tuple $(r_1, r_2, \ldots, r_7)$ and all conditions on $r_1$ and $r_2$ have been checked, and currently the algorithm will search for a suitable $r_3$. Initially t is 1 (t=1). The iterator is an object that allows the algorithm 700 to traverse through all elements of a matching set such as iterator $it_1$ and $M_{1,0}$. More iterators are used later in the algorithm, such as: $it_2$ traverses $M_{2,3}$, $it_3$ traverses $M_{3,4}$, $it_4$ traverses $M_{4,4}$, $it_5$ traverses $M_{5,2}$, $it_6$ traverses $M_{6,2}$ and $it_7$ traverses $M_{7,3}$. In general, every iterator $it_n$ traverses the matching set ordered last in $M_n$.

At block 720, the algorithm 700 checks if the value of the counter t is a positive integer, i.e., t>0. If the result from decision block 720 is "NO", i.e., t=0, then the algorithm 700 stops at block 725 meaning that all tuples satisfying the complete WHERE clause of the join query have been identified as produced. If the result from decision block 720 is "YES", then the algorithm continues at block 730. At block 730, the iterator $it_t$ is accessed. This iterator has been initialized either in block 715 or in an earlier traversal of block 770. The row $r_t$ is the row that $it_t$ currently points to; afterwards, $it_t$ is made to point to the next row in the matching set $it_t$ traverses, if there is one: $r_t = *it_t$; $it_t$++. When the value of the iterator increases, the algorithm moves to the next row of the matching set. For example, t=1, then $it_1$ first points to 2, since here $M_{1,0}=\{2,3\}$. At block 730, the partial specialization $\Gamma_t = \Gamma_{t-1}(r_t)$ is computed from $\Gamma_{t-1}$. This means that the algorithm is at a specific row ($r_t$) of the table and there are some attribute values in this row, which are taken to compute the partial specialization $\Gamma_t$ (since attribute values the reduction results are given as input for the algorithm). The computation of $\Gamma_{t-1}(r_t)$ is performed by taking the attribute values from the specified row $r_t$ and substituting these values into $\Gamma_{t-1}$.

At decision block 735, the algorithm 700 checks if the computed partial specialization $\Gamma_t$ is False, this is, whether the operator tree $\Gamma_t$ has degenerated into the simple constant expression False. If the result from decision block 735 is "YES", then the algorithm continues at block 740. At block 740, while the counter t is a positive integer (t>0) and the current iterator ($it_t$) points to the end of the matching set it traverses, hence no row, the value of the counter t is decreased by one or more count value. In an embodiment if, for the original value of t, $it_t$ points to some row of its matching set, then t remains unchanged. In another embodiment, t can be decreased by more than 1. For example, if t decreased from 5 to 3, this means that in the process of constructing the next join tuple, there is a 4-tuple $(r_1, r_2, r_3, r_4)$ constructed, which so far satisfies all necessary conditions and a suitable $r_5$ has to be found. However, this may fail. Thus, a better $r_4$ has to be found. But this may also fail, so a better $r_3$ will be needed in that case. Therefore, the algorithm resumes work on the current 2-tuple $(r_1, r_2)$, searching for a suitable $r_3$ as part of a 3-tuple $(r_1, r_2, r_3)$ that can be completed to a full N-tuple $(r_1, r_2, r_3, \ldots r_N)$ satisfying the WHERE clause. The algorithm 700 is returned to decision block 720. If the result from decision block 735 is "NO", then the algorithm continues at block 750. At decision block 750, the algorithm 700 checks whether the value of the tuple construction counter t is equal to N, the needed length for a tuple to be completed, which also equals the number of vertices in tire materialization graph. For example, N=7 is the number of relations from which a row is materialized and thus, the length of every valid tuple is 7.

If the result from decision block 750 is "YES", then the algorithm continues at block 755. At block 755, the tuple construction counter t is equal to the needed length (t==N), i.e., another N-tuple $(r_1, r_2, \ldots, r_N)$ is obtained satisfying the complete WHERE clause. In an embodiment, when a valid N-tuple $(r_1, r_2, \ldots, r_N)$ is found, it can be used immediately during the algorithm. This could be the choice if, for example, the join result is used as input by another operation on a second computer. For example, sending the join tuple to the second computer, letting it begin its work immediately instead of waiting for the first computer to complete. In an alternative embodiment, all found N-tuples $(r_1, r_2, \ldots, r_N)$ can be first collected and stored in a storage unit for later use.

If the result from decision block 750 is "NO", then the algorithm continues at block 760. At this point, the tuple constructed so far is shorter than a full TV-tuple and the algorithm 700 prepares for finding the rows that are still needed to complete the full tuple. At block 760, all matching sets that depend on $r_t$ are recomputed. These matching sets are identified by the condition that their tail equals t. At decision block 765, the algorithm checks whether any one of the just recomputed matching sets turned empty. If the result from decision block 765 is "YES", then the algorithm continues at block 740. This means that if there is an empty matching set, then no full join tuple can be constructed from the current shorter tuple. At block 740, while counter t is a positive integer (t>0) and tire current iterator ($it_t$) points to the end of the matching set it traverses, hence to no row, the value of the tuple construction counter t is decreased. The algorithm returns to block 720 and tries to find a new row $r_t$ with the decreased value of t.

If the result from decision block 765 is "NO", then the algorithm continues at block 770. This means that there are no empty matching sets. At block 770, the value of the counter t is increased by "1" (as part of the loop), indicating that the current tuple, which is to be prolonged to a full N-tuple, has successfully been prolonged by 1. The algorithm is returned to block 720 where the algorithm searches for a row $r_t$, with the increased value of t. The algorithm 700 terminates when t=0, indicating that all join tuples have been produced.

Algorithm 700 can be presented with the following code as well:

TABLE 2

Join Tuple Assembly Algorithm by Partial Specializations (700)

```
if Γ == False or M_{n,0} == ∅ for any 1 <= n <= N : Stop, the join is empty.
t = 1 ; it_1 = M_{1,0}.begin() ; Γ_0 = Γ ;
while (t > 0) {// loop invariants: 1) (r_1, r_2, ..., r_{t-1}) is a join tuple for G ∩ {1, 2, ..., t - 1},
    //            2) all M∈M with t(M) < t are known and not empty,
    //            3) it_t points to some row in the matching set it enumerates, and
    //            4) Γ_{t-1} != False.
    r_t = * it_t; it_t ++ ; // (r_1, r_2, ..., r_t) is a valid join tuple for G ∩ {1, 2, ..., t}
    use r_t to compute the next partial specialization: Γ_t = Γ_{t-1}(r_t);
    incr = (Γ_t != False) ; // t is incremented⇔ r_t prolongs (r_1, r_2, ..., r_{t-1})
    if (incr and t < N) {// recompute all M∈M with t(M) = t for all arrows t →ᵃ n leaving t while incr:

{// in the order of M : by n increasing!
            compute M_a = M_{n,t} = M_{n,t-1} ∩ a (r_t);
            incr = (M_a != ∅) ;

if S(a) == {b}, k →ᵇ n and incr: { compute M_{ab^{-1}} = M_{k,t} = M_{k,t-1} ∩ b^{-1} (M_a);
                incr = (M_{ab^{-1}} != ∅);
            }
        }
    }
    if(incr) {
        t ++ ; // for the new t, let M_{t,r} be the matching set ordered last in M_t
        it_t = M_{t,r}.begin() ; // since M_{t,r} != ∅, it_t points to some row
    }
    else {
        if (t == N and Γ_N == True): (r_1, r_2, ..., r_N), the next join tuple, has been produced
        // try next r_t at the same t if possible, otherwise decrease t:
        while (t > 0) and it_t does not point to any row: t -- ;
    }
}
```

The algorithm 700 accelerates the process of join tuple assembly in the method of semi-join reduction such that the method itself becomes faster and, when compared to other implementations, also decreases memory consumption. The join tuple assembly process is accelerated by algorithm 700 by using decision steps at several places (e.g., blocks 730 and 750) checking as early as possible whether to stop the computation, if it is clear that the current tuple cannot be completed. For example, at decision block 735, if the operator tree $Γ_t$, depending on $(r_1, r_2, \ldots, r_t)$, is identical to False, then there is no chance that the last operator tree $Γ_N$ could ever become True. Instead, the algorithm is returned to block 720 to find another $r_1$ that does not make the operator tree $Γ_t$ identical to False. Similarly, at block 765 if during recomputation of a subset of the matching sets, an empty matching set is encountered, then the algorithm is returned again to block 720, because the algorithm is aware that at this place for some positions of the join tuple to be filled later, there will be no eligible candidates. These are the earliest possible detections of future failures, using only computations that may not be avoided, hence causing no extra cost. In this way, algorithm 700 avoids redundant iterations in the loop and performing the same computation twice, which reflects on the join tuple assembly acceleration.

Figure 8A:
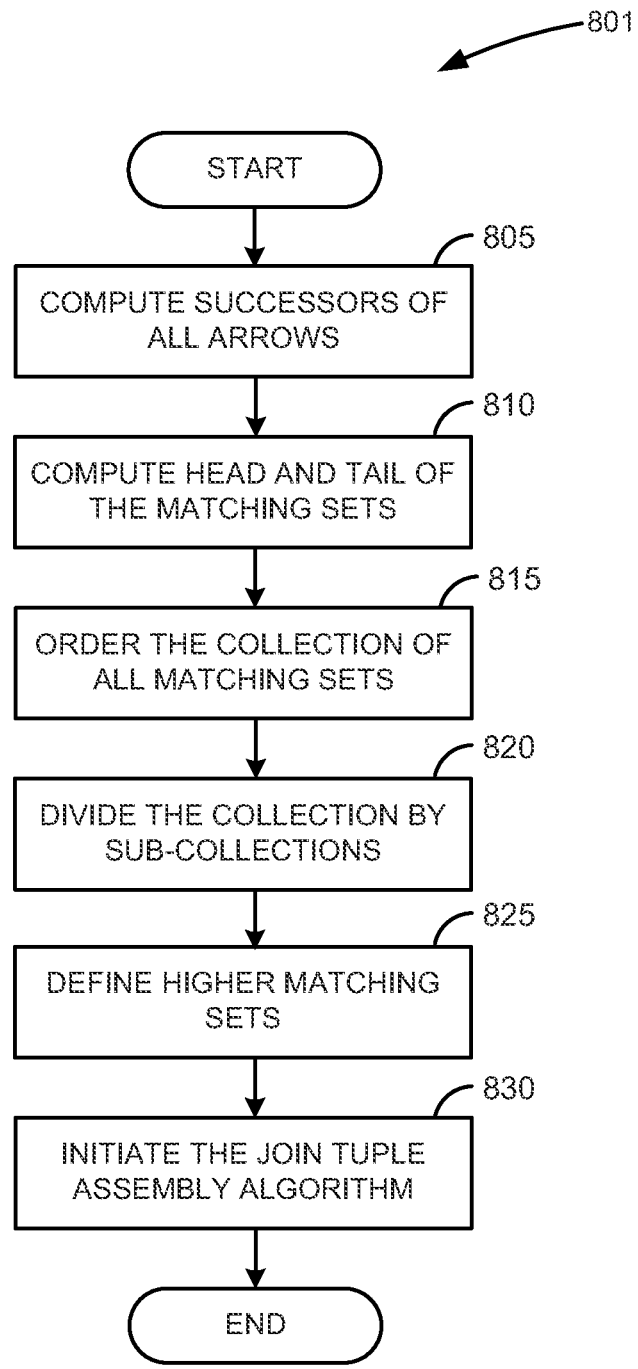
FIGS. 8A and 8B are flow diagrams illustrating an example of the method for query evaluation including the join tuple assembly algorithm by partial specializations.
Figure 8B:
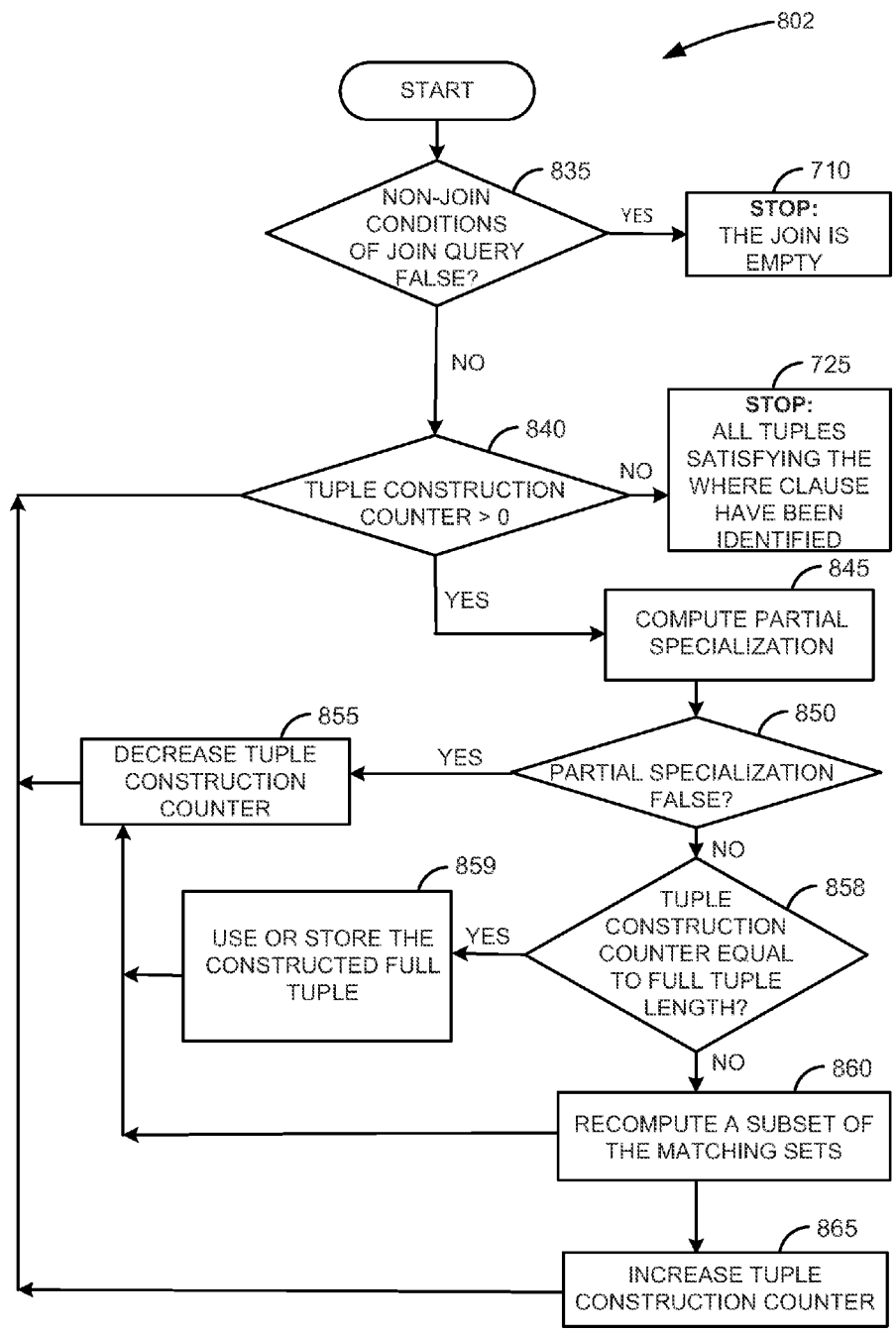

FIGS. 8A and 8B are flow diagrams of the method for query evaluation including the join tuple assembly algorithm by partial specializations. Algorithm 700 can be applied to the example of the method for query evaluation provided with FIGS. 1-5 to illustrate better how it works. Method 801 of FIG. 8A presents an overview of the join tuple assembly algorithm, including its data independent preparatory steps. Method 802 gives the details left implicit in step 830 of method 801; the computations are data dependent. Having the materialization graph (e.g., MG 510), method 801 begins with some calculations depending only on the topology of MG 510. At block 805, the successors of all arrows are calculated: $S(a)=\phi$, $S(b)=\phi$, $S(c)=\{f\}$; $S(d)=\{g\}$; $S(e)=\{j\}$; $S(f)=\{i\}$; $S(g)=\phi$, $S(h)=\{k\}$; $S(i)=\phi$, $S(k)=\{l\}$; $S(l)=\phi$. At block 810, the matching sets with their head and tail functions are computed from MG 510:

TABLE 3

Matching Sets with Their Head and Tail Values

| | | |
|---|---|---|
| $h(M_{1,0}) = 1$, $t(M_{1,0}) = 0$ | $h(M_b) = 3$, $t(M_b) = 1$ | $h(M_{ff^{-1}}) = 3$, $t(M_{ff^{-1}}) = 2$ |
| $h(M_{2,0}) = 2$, $t(M_{2,0}) = 0$ | $h(M_c) = 4$, $t(M_c) = 1$ | $h(M_g) = 5$, $t(M_g) = 2$ |
| $h(M_{3,0}) = 3$, $t(M_{3,0}) = 0$ | $h(M_{cf^{-1}}) = 2$, $t(M_{cf^{-1}}) = 1$ | $h(M_h) = 7$, $t(M_h) = 2$ |
| $h(M_{4,0}) = 4$, $t(M_{4,0}) = 0$ | $h(M_d) = 5$, $t(M_d) = 1$ | $h(M_{hk^{-1}}) = 3$, $t(M_{hk^{-1}}) = 2$ |
| $h(M_{5,0}) = 5$, $t(M_{5,0}) = 0$ | $h(M_{dg^{-1}}) = 2$, $t(M_{dg^{-1}}) = 1$ | $h(M_i) = 4$, $t(M_i) = 3$ |
| $h(M_{6,0}) = 6$, $t(M_{6,0}) = 0$ | $h(M_e) = 6$, $t(M_e) = 1$ | $h(M_j) = 6$, $t(M_j) = 3$ |
| $h(M_{7,0}) = 7$, $t(M_{7,0}) = 0$ | $h(M_{ej^{-1}}) = 3$, $t(M_{ej^{-1}}) = 1$ | $h(M_k) = 7$, $t(M_k) = 3$ |
| $h(M_a) = 2$, $t(M_a) = 1$ | $h(M_f) = 4$, $t(M_f) = 2$ | $h(M_{kl^{-1}}) = 4$, $t(M_{kl^{-1}}) = 3$ |
| | | $h(M_l) = 7$, $t(M_l) = 4$ |

Then, the collection of all matching sets M is ordered using the computed head and tail functions, at block 815. The ordering of the matching sets follows the definitions given above. First, the matching sets that are not of the type $M_{ab}^{-1}$ are ordered, these are the reduction results $M_{n,0}$ and the sets of type $M_a$. For these matching sets, the order is: first by ascending tail function; and then, for equal values of the tail function, by ascending head function. These indications are sufficient since for these types of sets no two different sets have the same head and tail. Then, every matching set $M_{ab}^{-1}$ is placed immediately after its corresponding set $M_a$. According to the example, the resulting ordering is:

TABLE 4

Ordered Collection of all Matching Sets $M = \{M_{1,0}, M_{2,0}, M_{3,0}, M_{4,0}, M_{5,0}, M_{6,0}, M_{7,0}, M_a, M_b, M_c, M_{cf^{-1}}, M_d,$
$M_{dg^{-1}}, M_e, M_{ej^{-1}}, M_f, M_{fi^{-1}}, M_g, M_h, M_{hk^{-1}}, M_i, M_j, M_k, M_{kl^{-1}}, M_l\}$ At block 820, the collection of all matching sets M is divided into a number of sub-collections containing matching sets with equal head function:

TABLE 5

Sub-Collections of all Matching Sets by Equal Head $M_1 = \{M_{1,0}\}$
$M_2 = \{M_{2,0}, M_a, M_{cf^{-1}}, M_{dg^{-1}}\}$
$M_3 = \{M_{3,0}, M_b, M_{ej^{-1}}, M_{fi^{-1}}, M_{hk^{-1}}\}$
$M_4 = \{M_{4,0}, M_c, M_f, M_i, M_{kl^{-1}}\}$
$M_5 = \{M_{5,0}, M_d, M_g\}$
$M_6 = \{M_{6,0}, M_e, M_j\}$
$M_7 = \{M_{7,0}, M_h, M_k, M_l\}$ These sub-collections can be renumbered to represent the order of a given matching set in a given sub-collection. This is:

TABLE 6

Renumbered Matching Sets $M_1 = \{M_{1,0}\}$
$M_2 = \{M_{2,0}, M_{2,1}, M_{2,2}, M_{2,3}\}$
$M_3 = \{M_{3,0}, M_{3,1}, M_{3,2}, M_{3,3}, M_{3,4}\}$
$M_4 = \{M_{4,0}, M_{4,1}, M_{4,2}, M_{4,3}, M_{4,4}\}$
$M_5 = \{M_{5,0}, M_{5,1}, M_{5,2}\}$
$M_6 = \{M_{6,0}, M_{6,1}, M_{6,2}\}$
$M_7 = \{M_{7,0}, M_{7,1}, M_{7,2}, M_{7,3}\}$
where: $M_{2,1} = M_a, M_{2,2} = M_{cf^{-1}}, M_{2,3} = M_{dg^{-1}}$
$M_{3,1} = M_b, M_{3,2} = M_{ej^{-1}}, M_{3,3} = M_{fi^{-1}}, M_{3,4} = M_{hk^{-1}}$
$M_{4,1} = M_c, M_{4,2} = M_f, M_{4,3} = M_i, M_{4,4} = M_{kl^{-1}}$
$M_{5,1} = M_d, M_{5,2} = M_g, M_{6,1} = M_e, M_{6,2} = M_j$
$M_{7,1} = M_h, M_{7,2} = M_k, M_{7,3} = M_l$ At block 825, the matching sets $M_{n,i}$ with $i>0$ are recursively defined using the reduction results $M_{n,0}$ as the induction basis. As set in the example of FIGS. 1-5, it is assumed that a 6-tuple $(r_1, r_2, r_3, r_4, r_5, r_6) \in R_1 \times R_2 \times R_3 \times R_4 \times R_5 \times R_6$ is given. The example of FIGS. 1-5 includes a 7-tuple $(r_1, r_2, r_3, r_4, r_5, r_6, r_7) \in R_1 \times R_2 \times R_3 \times R_4 \times R_5 \times r_6 \times R_7$, but since the last vertex is a sink in the materialization graph 510, reflecting a general property of all materialization graphs, the last tuple (i.e., $r_7$) will never be used. The defined matching sets depend on appropriate parts of this 6-tuple. Simultaneously, it is verified that the extent of dependency of the matching sets on the 6-tuple $(r_1, r_2, r_3, r_4, r_5, r_6)$ is correctly reproduced by the tail function, as described above.

The definition of the higher matching sets begins by setting: $M_a = M_{2,1} = M_{2,0} \cap a(r_1)$. The predicate a is $a(x, y) = (x \cdot a = y \cdot a)$ for $x \in R_1$, $y \in R_2$, where the set $a(r_1)$, depending on the first element $r_1$ of the 6-tuple, is $a(r_1) = \{x \in R_2 : x \cdot a = r_1 \cdot a\}$ so that matching set $M_a$ has been defined: $M_a = M_{2,1} = \{x \in M_{2,0}: s \cdot a = r_1 \cdot a\}$. Hence, $M_a = M_{2,1}$ depends on $r_1$, but not on $r_2, r_3, r_4, r_5, r_6$. Since $t(M_a) = 1$, this agrees with the following general observation: if $M \in M$ is a matching set with $0 <= t = t(M) < N$, then: 1) M does not depend on $r_{t+1}, \ldots, r_{N-1}$; and 2) if $t>0$, then M depends on $r_t$. Analogously, matching sets $M_b$ and $M_c$ can be defined: $M_b = M_{3,1} = M_{3,0} \cap b(r_1)$ and $M_c = M_{4,1} = M_{4,0} \cap c(r_1)$.

The next matching set in the ordering of M is $M_{cf^{-1}} = M_{2,2}$. The definition of $M_{cf^{-1}}$ uses the previously defined $M_c = M_{4,1}$ and $M_a = M_{2,1}: M_{cf^{-1}} = M_{2,2} M_{2,1} \cap f^1(M_c)$. The predicate f in f this example is $f(x,y) = (x, f = y, f)$ for $x \in R_2$, $y \in R_4$. An explicit description of the set $f^1(M_c) = \{x \in R_2: x \cdot f = y \cdot f$ for some $y \in M_c\}$. Therefore, the matching set $M_{cf^{-1}}$ can be defined explicitly as: $M_{cf^{-1}} = M_{2,2} = \{x \in M_{2,1}: x \cdot f = y \cdot f$ for some $y \in M_c\}$. Since $M_c = M_{4,1}$ and $M_a = M_{2,1}$ both depend on $r_1$, but not on $r_2, r_3, r_4, r_5, r_6$; the same is valid for $M_{cf^{-1}} = M_{2,2}$, in accordance with $t(M_{cf^{-1}}) = 1$.

Analogously, the following matching sets can be defined, as all of them have a tail equal to 1 and depend on $r_1$, but not on $r_2, r_3, r_4, r_5, r_6$.

TABLE 7

Matching Sets M with tail t(M) = 1

$M_d = M_{5,1} = M_{5,0} \cap d(r_1)$
$M_{dg^{-1}} = M_{2,3} = M_{2,2} \cap g^{-1}(M_d)$
$M_e = M_{6,1} = M_{6,0} \cap e(r_1)$
$M_{ej^{-1}} = M_{3,2} = M_{3,1} \cap j^{-1}(M_e)$ Further, in the ordering of M the matching sets with tail $t(M) = 2$ are defined. These matching sets depend on $r_1, r_2$, but not on $r_3, r_4, r_5, r_6$:

TABLE 8

Matching Sets M with tail t(M) = 2

$M_f = M_{4,2} = M_{4,1} \cap f(r_2)$
$M_{fi^{-1}} = M_{3,3} = M_{3,2} \cap i^{-1}(M_f)$
$M_g = M_{5,2} = M_{5,1} \cap g(r_2)$
$M_h = M_{7,1} = M_{7,0} \cap h(r_2)$
$M_{hk^{-1}} = M_{3,4} = M_{3,3} \cap k^{-1}(M_h)$ Further, in the ordering of M the matching sets with tail $t(M) = 3$ are defined. These matching sets depend on $r_1, r_2, r_3$, but not on $r_4, r_5, r_6$:

TABLE 9

Matching sets M with tail t(M) = 3

$M_i = M_{4,3} = M_{4,2} \cap i(r_3)$
$M_j = M_{6,2} = M_{6,1} \cap j(r_3)$
$M_k = M_{7,2} = M_{7,1} \cap k(r_3)$
$M_{kl^{-1}} = M_{4,4} = M_{4,3} \cap l^{-1}(M_k)$ Finally, in the ordering of M the matching set with tail $t(M) = 4$ is defined, as in this example there is only one such matching set: $M_l = M_{7,3} = M_{7,2} \cap l(r_4)$. Similarly, the matching set $M_l$ depends on $r_1, r_2, r_3, r_4$, but not on $r_5, r_6$. In this example of the method for join query evaluation, there are no matching sets with tail $t(M) = 5, 6, 7$, since these vertices are sinks in the materialization graph 510. That is why no matching set depends on $r_5$ or $r_6$. However, it should be noted that for other materialization graphs on 7 vertices matching sets with tail $t(M) = 5, 6$ may exist.

At block 830, the join tuple assembly algorithm is initiated to construct all join tuples satisfying the complete WHERE clause; each of them is a 7-tuple $(r_1, r_2, r_3, r_4, r_5, r_6, r_7) \in R_1 \times R_2 \times R_3 \times R_4 \times R_5 \times R_6 \times R_7$. At the outset, their number is unknown; both options are possible: there might be no join tuples at all or there might be up to $|R_1|*|R_2|*|R_3|*|R_4|*|R_5|*|R_6|*|R_7|$ join tuples. Their number also has to be determined by the algorithm.

FIG. 8B and method 802 continue the example of method 801 by presenting the join tuple assembly algorithm 700 in details. The example is based on the example of FIGS. 1-5. The reduction results (e.g., reduced relations $R_1$ 405, $R_2$ 410, $R_3$ 415, $R_4$ 420, $R_5$ 425, $R_6$ 430, and $R_7$ 435) are taken as an input for the algorithm 700. Therefore, having the reduced relation in hand, the following matching sets with reduction results are obtained: $M_{1,0}=\{2,3\}$, $M_{2,0}=\{4,5\}$, $M_{3,0}=\{2,3\}$, $M_{4,0}=\{3,4\}$, $M_{5,0}=\{2,3\}$, $M_{6,0}=\{1,2,4,5\}$, and $M_{7,0}=\{1,2\}$. It should be noted that reduction means repeatedly eliminating all rows that have no join partner from tire relations.

At block 835, the non-join conditions of the WHERE clause are checked. Since $M_{1,0}=\{2,3\}\neq\phi, \ldots, M_{7,0}=\{1,2\}\neq\phi$ and $$\Gamma=(R_1\cdot z)^2+(R_2\cdot z)^2+(R_3\cdot z)^2+(R_4\cdot z)^2+(R_5\cdot z)^2+(R_6\cdot z)^2+(R_7\cdot z)^2<=1000$$

AND $$((R_1\cdot z*R_2\cdot z*R_3\cdot z*R_4\cdot z>=1000) \text{ OR } (R_1\cdot z*R_2\cdot z*R_3\cdot z*R_4\cdot z=0))$$

is not identical to the constant expression False, the algorithm is initialized by setting the counter $t=1$, the iterator $it_1$ points to $2\in M_{1,0}=\{2,3\}$ and $\Gamma_0=\Gamma$ is set up as the first member of the sequence of successive partial specializations to come. At this point of the algorithm, a 0-tuple is constructed. The algorithm 700 has to select a suitable $r_1\in M_{1,0}$, of which it might be possible to complete it to a full 7-tuple $(r_1, r_2, r_3, r_4, r_5, r_6, r_7)\in R_1\times R_2\times R_3\times R_4\times R_5\times R_6\times R_7$ satisfying the complete WHERE clause.

At block 840, the algorithm 700 checks if the tuple construction counter is a positive integer. Since in the current example, the tuple counter is a positive integer, the loop of algorithm 700 is entered. Executing $r_t=*it_t$; $it_t++$ from block 730 of algorithm 700 leads to $r_1=2$ and $it_1$ pointing to $3\in M_{1,0}=\{2,3\}$. At block 845, the first partial specialization is computed. Using the attribute value $r_1\cdot z=9$, the partial specialization $\Gamma_1=\Gamma_0(r_1)$ of $\Gamma_0$ can be computed by substituting the attribute value into $\Gamma_0$:

$$\Gamma_i=9^2+(R_2\cdot z)^2+(R_3\cdot z)^2+(R_4\cdot z)^2+(R_5\cdot z)^2+(R_6\cdot z)^2+(R_7\cdot z)^2<=1000$$

AND $$((9*R_2\cdot z*R_3\cdot z*R_4\cdot z>=1000) \text{ OR } (9*R_2\cdot z*R_3\cdot z*R_4\cdot z=0))$$

This expression can be simplified to:

$$\Gamma_1=(R_2\cdot z)^2+(R_3\cdot z)^2+(R_4\cdot z)^2+(R_5\cdot z)^2+(R_6\cdot z)^2+(R_7\cdot z)^2<=919$$

AND $$((R_2\cdot z*R_3\cdot z*R_4\cdot z>=111.111) \text{ OR } (R_2\cdot z*R_3\cdot z*R_4\cdot z=0))$$

At block 850, the computed partial specialization is checked whether it is identical to the constant expression False. In the current example, this is not the case: since $\Gamma_1$ still contains variables, e.g. $R_2\cdot z$, it is not constant, so it is neither False nor True. If the computed partial specialization was False, then the algorithm will continue at block 855. At block 855, the tuple construction counter $t$ may remain unchanged if $it_1$ still points to some row, i.e., to $3\in M_{1,0}$ or the tuple counter may be decreased by one or more counts if the iterator $it_1$ points to no row. The algorithm then continues at block 840 where the same procedure has to be performed for the value $r_1=3$ that was just performed for the value $r_1=2$.

At block 858, the tuple construction counter is checked if its value is equal to the needed length of any join tuple. Since currently $t=1$ and the needed length is 7, a full 7-tuple is not constructed and the method continues at block 860. Otherwise the method continues at block 859 where the constructed full tuple is stored or used directly in some functionality. At block 860, all matching sets with $t(M)=1$ are computed for the first time (and recomputed on each next execution of the loop of algorithm 700), this is, those matching sets that depend on $r_1$ only. According to MG 510, all arrows with tail( )=1, ordered by head( ) ascending, are:

$$1 \xrightarrow{a} 2, 1 \xrightarrow{b} 3, 1 \xrightarrow{c} 4, 1 \xrightarrow{d} 5, 1 \xrightarrow{e} 6.$$

First, $M_a=M_{2,1}$ is computed: $M_a=M_{2,1}=\{x\in M_{2,0}:x\cdot a=r_1\cdot a\}$. Since $r_1\cdot a=2$, $M_a=M_{2,1}=\{x\in M_{2,0}:x\cdot a=2\}$. Since $M_{2,0}=\{4,5\}$ and the row $x\in R_2$ with row ID=4 has $x\cdot a=2$, whereas the row $y\in R_2$ with row ID=5 has $y.a=3$, then $M_a=M_{2,1}=\{4\}$. The interpretation of the matching set $M_a$ is: only row ID=$4\in M_{2,0}$ matches $r_1=2$ under the join condition $a\in MG$ and thus has any chance to complete $r_1=2$ to a full 7-tuple $(r_1, r_2, r_3, r_4, r_5, r_6, r_7)\in R_1\times R_2\times R_3\times R_4\times R_5\times R_6\times R_7$ satisfying the complete WHERE clause.

Analogously, the matching sets $M_b$ and $M_c$ are computed. Since $M_b=M_{3,1}=\{x\in M_{3,0}:x\cdot b=r_1\cdot b\}$ and $M_c=M_{4,1}=\{x\in M_{4,0}:x\cdot c=r_1\cdot c\}$ and $r_1\cdot b=4$ and $r_1\cdot c=6$, then $M_b=M_{3,1}=\{x\in M_{3,0}:x\cdot b=4\}=\{3\}$ and $M_c\rightarrow M_{4,1}=\{x\in M_{4,0}:x\cdot c=6\}=\{3\}$.

Further, the matching set $M_{cf}^{-1}=M_{2,2}$ is computed. As defined above, $M_{cf}^{-1}=M_{2,2}=\{x\in M_{2,1}:x\cdot f=y\cdot f$ for some $y\in M_c\}$. Since $M_c=\{3\}$ in this case is a singleton (a set with exactly one element), the set $\{y\cdot f:y\in M_c\}=\{12\}$ is also a singleton. Therefore, $M_{cf}^{-1}=M_{2,2}=\{x\in M_{2,1}:x\cdot f=12\}$ has to be evaluated. Since only row ID=4 in reduction table $R_2$ 410 satisfies this condition, then $M_{cf}^{-1}=M_{2,2}=\{4\}$.

Analogously, the matching sets $M_d$, $M_{dg}^{-1}$, $M_e$, and $M_{ej}^{-1}$ are computed: $M_d=M_{5,1}=\{x\in M_{5,0}:x\cdot d=r_1\cdot d\}=\{x\in M_{5,0}:x\cdot d=8\}=\{2\}$; $M_{dg}^{-1}=M_{2,3}=\{x\in M_{2,2}:x\cdot g=y\cdot g$ for some $y\in M_d\}=\{x\in M_{2,2}:x\cdot g=9\}=\{4\}$; $M_e=M_{6,1}=\{x\in M_{6,0}:x\cdot e=r_1\cdot e\}=\{x\in M_{6,0}:x\cdot e=10\}=\{2,4\}$; and $M_{ej}^{-1}=M_{3,2}=\{x\in M_{3,1}:x\cdot j=y\cdot j$ for some $y\in M_e\}$. Although $M_e=\{2,4\}$ is a 2-element set, these two rows happen to have identical j attributes and thus $\{y\cdot j:y\in M_e\}=\{12\}$ and $M_{ej}^{-1}=M_{3,2}=\{x\in M_{3,1}:x\cdot j=12\}=\{3\}$. The last computed matching set $M_{ej}^{-1}$ can be interpreted as follows: for $r_1=2$, only the subset: $\{3\}=M_{ej}^{-1}=M_{3,2}\subseteq M_{3,0}=\{2,3\}$, matches $r_1$ under the join condition $b\in MG$ (since $M_{3,2}\subseteq M_{3,1}=M_b$) and matches, under join condition $j\in MG$, some row in $M_{6,0}$, which under join condition $e\in MG$, matches $r_1$. Thus, only the elements of $M_{ej}^{-1}=M_{3,2}$ satisfy the stated necessary conditions for $r_1$ to become completed to a full 7-tuple $(r_1, r_2, r_3, r_4, r_5, r_6, r_7)\in R_1\times R_2\times R_3\times R_4\times R_5\times R_6\times R_7$ satisfying the complete WHERE clause.

At this point of the computation, it is possible that the 1-tuple $(r_1=2)$ can be completed to a full 7-tuple $(r_1, r_2, r_3, r_4, r_5, r_6, r_7)$, because: 1) the first partial specialization $\Gamma_1$ is not False, thus the complete specialization $\Gamma_7$ could become True; and 2) all matching sets depending exactly on $r_1$, these are $M_a$, $M_b$, $M_c$, $M_{cf}^{-1}$, $M_d$, $M_{dg}^{-1}$, $M_e$, and $M_{ej}^{-1}$, were computed and proven to be non-empty sets, thus $r_1$ has a consistent choice of join partners in all joins it participates in.

At block 865, the tuple construction counter $t$ is increased by "1". This leads to $t=2$, which means that a 2-tuple $(r_1, r_2)$ is going to be constructed from the 1-tuple $(r_1=2)$. Considering the following descending chain of matching sets: $R_2\supseteq M_{2,0}\supseteq M_{2,1}\supseteq M_{2,2}\supseteq M_{2,3}$, the iterator $it_2$ points to row ID=$4\in M_{2,3}=\{4\}$. Method 802 is returned to block 840, where algorithm 700 is returned to the initial step of the loop as $r_2=4$ and $it_2$ points to the end of $M_{2,3}$. Using the attribute value $r_2\cdot z=5$ (the only attribute of $R_2$ referenced in $\Gamma_1$), the next partial specialization $\Gamma_2=\Gamma_1(r_2)$ is computed, as in block 845. Substituting the attribute value $r_2 \cdot z=5$ into $\Gamma_1$ leads to:

$$\Gamma_2=5^2+(R_3 \cdot z)^2+(R_4 \cdot z)^2+(R_5 \cdot z)^2+(R_6 \cdot z)^2+(R_7 \cdot z)^2<=919$$

AND $$((5*R_3 \cdot z*R_4 \cdot z>=111.111) \text{ OR } (5*R_3 \cdot z*R_4 \cdot z=0))$$

This expression can be simplified to:

$$\Gamma_2=(R_3 \cdot z)^2+(R_4 \cdot z)^2+(R_5 \cdot z)^2+(R_6 \cdot z)^2+(R_7 \cdot z)^2<=894$$

AND $$((R_3 \cdot z*R_4 \cdot z>=22.222) \text{ OR } (*R_3 z*R_4 \cdot z=0))$$

As $\Gamma_2$ is not False, all matching sets with tail $t(M)=2$ (those matching sets that depend exactly on $r_2$) are computed:

TABLE 10

| Computed Matching Sets Depending on ($r_1 = 2, r_2 = 4$) |
| --- |
| $M_f = M_{4,2} = \{x \in M_{4,1}:x.f = r_2.f\} = \{x \in M_{4,1}:x.f = 12\} = \{3\}$ |
| $M_{fi^{-1}} = M_{3,3} = \{x \in M_{3,2}:x.i = y.i \text{ for some } y \in M_f\} = \{x \in M_{3,2}:x.i = 14\} = \{3\}$ |
| $M_g = M_{5,2} = \{x \in M_{5,1}:x.g = r_2.g\} = \{x \in M_{5,1}:x.g = 9\} = \{2\}$ |
| $M_h = M_{7,1} = \{x \in M_{7,0}:x.h = r_2.h\} = \{x \in M_{7,0}:x.h = 5\} = \{2\}$ |
| $M_{hk^{-1}} = M_{3,4} = \{x \in M_{3,3}:x.k = y.k \text{ for some } y \in M_h\} = \{x \in M_{3,3}:x.k = 2\} = \{3\}$ |

Similarly, the 2-tuple $(r_1, r_2)$ could possibly be completed to a full 7-tuple $(r_1, r_2, r_3, r_4, r_5, r_6, r_7)$ because of the same reasons: 1) the second partial specialization $\Gamma_2$ is not False, thus the complete specialization $\Gamma_7$ could become True; and 2) all matching sets depending exactly on $r_2$ were computed and proven to be non-empty sets. Therefore, the tuple construction counter t is increased again to t=3, as in block 860. The method 802 continues the loop considering the descending chain $R_3 \supseteq M_{3,0} \supseteq M_{3,1} \supseteq M_{3,2} \supseteq M_{3,3} \supseteq M_{3,4}$ with t=3, gets $r_3=3$ and $it_3$ pointing to the end of $M_{3,4}=\{3\}$. Using the attribute value $r_3 \cdot x=14$ the next partial specialization $\Gamma_3=\Gamma_2(r_3)$ is computed:

$$\Gamma_3=14^2+(R_4 \cdot z)^2+(R_5 \cdot z)^2+(R_6 \cdot z)^2+(R_7 \cdot z)^2<=894$$

AND $$((14*R_4 \cdot z>=22.222) \text{ OR } (14*R_4 \cdot z=0))$$

This expression can be simplified to:

$$\Gamma_3=(R_4 \cdot z)^2+(R_5 \cdot z)^2+(R_6 \cdot z)^2+(R_7 \cdot z)^2<=698$$

AND $$((R_4 \cdot z>=1.5873) \text{ OR } (R_4 \cdot z=0))$$

As $\Gamma_3$ is not False, all matching sets with tail $t(M)=5$ (those matching sets that depend exactly on $r_3$) are computed:

TABLE 11

| Computed Matching Sets Depending on ($r_1 = 2, r_2 = 4, r_3 = 3$) |
| --- |
| $M_i = M_{4,3} = \{x \in M_{4,2}:x.i = r_3.i\} = \{x \in M_{4,2}:x.i = 14\} = \{3\}$ |
| $M_j = M_{6,2} = \{x \in M_{6,1}:x.j = r_3.j\} = \{x \in M_{6,1}:x.j = 12\} = \{2, 4\}$ |
| $M_k = M_{7,2} = \{x \in M_{7,1}:x.k = r_3.k\} = \{x \in M_{7,1}:x.k = 2\} = \{2\}$ |
| $M_{kl^{-1}} = M_{4,4} = \{x \in M_{4,3}:x.l = y.l \text{ for some } y \in M_k\} = \{x \in M_{4,3}:x.l = 15\} = \{3\}$ |

Similarly, the tuple construction counter is increased once more to t=4. Considering the descending chain $R_4 \supseteq M_{4,0} \supseteq M_{4,1} \supseteq M_{4,2} \supseteq M_{4,3} \supseteq M_{4,4}$, on the next entry in the loop, $r_4=3$ and $it_4$ pointing to the end of $M_{4,4}=\{3\}$. Using the attribute value $r_4 \cdot z=10$, the next partial specialization $\Gamma_4=\Gamma_3(r_4)$ is computed:

$$\Gamma_4=10^2+(R_5 \cdot z)^2+(R_6 \cdot z)^2+(R_7 \cdot z)^2<=698$$

AND $$((10>=1.5873) \text{ OR } (10=0))$$

This expression can be simplified to:

$$\Gamma_4=(R_5 \cdot z)^2+(R_6 \cdot z)^2+(R_7 \cdot z)^2<=598$$

AND (True OR False)

The second part of the expression becomes True, since one sub-part of it is True. Therefore: $\Gamma_4=(R_5 \cdot z)^2+(R_6 \cdot z)^2+(R_7 \cdot z)^2<=598$. The AND node contains no branch that is False, therefore it does not become False. In this case all True branches of the operator tree can be removed: $\Gamma_4=(R_5 \cdot z)^2+(R_6 \cdot z)^2+(R_7 \cdot z)^2<=598$. AND. Now, the AND node contains exactly one branch and can therefore be replaced by this branch, decreasing the height of $\Gamma_4$ and making it a tree of one node: $\Gamma_4=(R_5 \cdot z)^2+(R_6 \cdot z)^2+(R_7 \cdot z)^2<=598$.

Since $\Gamma_4$ is still not constant, hence different from False, all matching sets with tail $t(M)=4$ are computed (those matching sets that depend exactly on $r_1=2, r_2=4, r_3=3, r_4=3$). This is only one set:

$$M_l=M_{7,3}=M_{7,2} \cap l(r_4)=\{x \in M_{7,2}:x.l=r_4.l\}= \{x \in M_{7,2}:x.l=15\}=\{2\}$$

Further, the tuple construction counter is increased to t=5. Considering the matching set chain $R_5 \supseteq M_{5,0} \supseteq M_{5,1} \supseteq M_{5,2}$, and the iterator $it_5$ points to the end of $M_{5,2}=\{2\}$. Using the attribute value $r_5 \cdot z=12$, the next partial specialization $\Gamma_5=\Gamma_4(r_5)$ is computed: $\Gamma_5=12^2+(R_6 \cdot z)^2+(R_7 \cdot z)^2<=598$, which simplified leads to: $\Gamma_5=(R_6 \cdot z)^2+(R_7 \cdot z)^2<=454$. Since there are no matching sets to compute, steps 760 and 765 of the algorithm 700 are skipped and the algorithm proceeds with increasing the counter t to t=6 (as in step 770). Considering the descending chain $R_6 \supseteq M_{6,0} \supseteq M_{6,1} \supseteq M_{6,2}$, on the next entry in the loop, $r_6=2$ and $it_6$ points to row $ID=2 \in M_{6,2}=\{2,4\}$. Using the attribute value $r_6 \cdot z=25$, the next partial specialization $\Gamma_6=\Gamma_5(R_6)$ is computed: $\Gamma_6=25^2+(R_7 \cdot z)^2<=454$, which simplified leads to: $\Gamma_6=(R_7 \cdot z)^2<=-171$. All attributes values of the relations are integer values, hence real numbers, and a square of a real number can never be negative. Thus, the partial specialization $\Gamma_6$ is False.

At this point of the example, one of the partially specialized operator trees $\Gamma_t$ is False. The tuple construction counter remains unchanged at t=6, since at block 740 $it_6$ points to $4 \in M_{6,2}=\{2,4\}$. Therefore, the constructed tuple $(r_1=2, r_2=4, r_3=3, r_4=3, r_5=2)$ also remains unchanged and the computed matching sets with tail $t(M)<=5$ are not recomputed. At block 730, $r_6=4$ and $it_6$ pointing to the end of $M_{6,2}$ are set. At this point, the algorithm has to compute $\Gamma_6$ for $r_6=4$. However, the attribute value is the same for both rows of the table: again, $r_6 \cdot z=25$. Thus, the recomputation of $\Gamma_6$ becomes unnecessary as the partial specialization $\Gamma_6$ is still False. At this point, there is no other $r_6$ available (meaning no other rows in the matching set $M_{6,2}=\{2,4\}$). The current iterator positions are: $it_6$ points to the end of $M_{6,2}=\{2,4\}$; $it_5$ points to the end of $M_{5,2}=\{2\}$; $it_4$ points to the end of $M_{4,4}=\{3\}$; $it_3$ points to the end of $M_{3,4}=\{3\}$; $it_2$ points to the end of $M_{2,3}=\{4\}$; $it_1$ points to $3 \in M_{1,0}=\{2,3\}$. Therefore, the first iterator in this sequence pointing to any row within its matching set is $it_1$.

This means that the 6-tuple $(r_1=2, r_2=4, r_3=3, r_4=3, r_5=2, r_6=4)$ cannot be completed to any 7-tuple satisfying the complete WHERE clause. Additionally, when $(r_1=2, r_2=4, r_3=3, r_4=3, r_5=2)$ are fixed, there is no choice of a next $r_6$. Therefore, even the 5-tuple $(r_1=2, r_2=4, r_3=3, r_4=3, r_5=2)$ cannot be completed to 7-tuple. Again, when $(r_1=2, r_2=4, r_3=3, r_4=3)$ are fixed, there is no choice of a next $r_5$. Therefore, even the 4-tuple $(r_1=2, r_2=4, r_3=3, r_4=3)$ cannot be completed. This continues until it becomes evident that even the 1-tuple $(r_1=2)$ cannot be completed. Thus, a new $r_1$ is needed and since in the current scenario, in contrast to the scenarios before, a new $r_1$ exists, the algorithm decides to continue and not to stop as join tuples satisfying the WHERE clause could exist. Algorithm 700 reflects this situation, in step 740, by decreasing the tuple construction counter from t=6 to t=1.

Method 802 is then returned to block 840, where tire loop is entered again. At this point $r_1=3$ and iterator $it_1$ pointing to the end of $M_{1,0}$ are set. The last partial specialization used was $\Gamma_{t-1}=\Gamma_0$. From this, using the attribute value $r_1 \cdot z=10$, the next partial specialization $\Gamma_1=\Gamma_0(r_1)$, is computed:

$$\Gamma_1=10^2+(R_2 \cdot z)^2+(R_3 \cdot z)^2+(R_4 \cdot z)^2+(R_5 \cdot z)^2+(R_6 \cdot z)^2+(R_7 \cdot z)^2 <=1000$$

AND $$((10*R_2 \cdot z*R_3 \cdot z*R_4 \cdot z>=1000) \text{ OR } (10*R_2 \cdot z*R_3 \cdot z*R_4 \cdot z=0))$$

This expression can be simplified to:

$$\Gamma_1=(R_2 \cdot z)^2+(R_3 \cdot z)^2+(R_4 \cdot z)^2+(R_5 \cdot z)^2+(R_6 \cdot z)^2+(R_7 \cdot z)^2<=900$$

AND $$((R_2 \cdot z*R_2 \cdot z*R_4 \cdot z>=100) \text{ OR } (R_2 \cdot z*R_3 \cdot z*R_4 \cdot z=0))$$

Since $\Gamma_1$ is not the constant expression False and t=1 did not yet reach the required level of N=7, the matching sets with tail t(M)=1, i.e., those matching sets that depend exactly on $r_1=3$ are recomputed. It should be noted that this cannot be avoided since $r_1$ changed and its attribute values also changed. At the same time all matching sets with tail less than t are not recomputed. In the specific examples, where t scaled down from t=6 to t=1, this could be unnoticed, since this leads to the event that only the reduction results $M_{n,0}$ are not recomputed, having a tail ( ) of 0. If however t had only scaled down from t=6 to t=5, which indeed is the typical case, all matching sets of tails 0, 1, 2, 3 or 4, that is, all matching sets would remain valid:

TABLE 12

Computed Matching Sets Depending on $(r_1 = 3)$ $M_a = M_{2,1} = \{x \in M_{2,0} : x.a = r_1.a\} = \{x \in M_{2,0} : x.a = 3\} = \{5\}$
$M_b = M_{3,1} = \{x \in M_{3,0} : x.b = r_1.b\} = \{x \in M_{3,0} : x.b = 6\} = \{2\}$
$M_c = M_{4,1} = \{x \in M_{4,0} : x.c = r_1.c\} = \{x \in M_{4,0} : x.c = 9\} = \{4\}$
$M_{cf^{-1}} = M_{2,2} = \{x \in M_{2,1} : x.f = y.f \text{ for some } y \in M_c\} = \{x \in M_{2,1} : x.f = 14\} = \{5\}$
$M_d = M_{5,1} = \{x \in M_{5,0} : x.d = r_1.d\} = \{x \in M_{5,0} : x.d = 12\} = \{3\}$
$M_{dg^{-1}} = M_{2,3} = \{x \in M_{2,2} : x.g = y.g \text{ for some } y \in M_d\} = \{x \in M_{2,2} : x.g = 9\} = \{5\}$
$M_e = M_{6,1} = \{x \in M_{6,0} : x.e = r_1.e\} = \{x \in M_{6,0} : x.e = 15\} = \{1, 5\}$
$M_{ej^{-1}} = M_{3,2} = \{x \in M_{3,1} : x.j = y.j \text{ for some } y \in M_e\} = \{x \in M_{3,1} : x.j = 15\} = \{2\}$ Following algorithm 700, the tuple construction counter is increased to t=2; $r_2=5$, and the iterator $it_2$ points to the end of $M_{2,3}=\{5\}$. Using the attribute value $r_2 \cdot z=0$, the next partial specialization $\Gamma_2=\Gamma_1(r_2)$ is computed, as in block 845. Substituting the attribute value $r_2 \cdot z=0$ into $\Gamma_1$ leads to:

$$\Gamma_2=0^2+(R_3 \cdot z)^2+(R_4 \cdot z)^2+(R_5 \cdot z)^2+(R_6 \cdot z)^2+(R_7 \cdot z)^2<=900$$

AND $$((0*R_3 \cdot z*R_4 \cdot z>=1000) \text{ OR } (0*R_3 \cdot z*R_4 \cdot z=0))$$

As the second part of the Boolean expression is True, the height of the operator tree $\Gamma_2$ decreases and $\Gamma_2$ becomes a one-node tree:

$$\Gamma_2=(R_3 \cdot z)^2+(R_4 \cdot z)^2+(R_5 \cdot z)^2+(R_6 \cdot z)^2+(R_7 \cdot z)^2<=900$$

Since $\Gamma_2$ is not the constant expression False, tire matching sets with tail t(M)=2 are:

TABLE 13

Computed Matching Sets Depending on $(r_1 = 3, r_2 = 5)$ $M_f = M_{4,2} = \{x \in M_{4,1} : x.f = r_2.f\} = \{x \in M_{4,1} : x.f = 14\} = \{4\}$
$M_{fi^{-1}} = M_{3,3} = \{x \in M_{3,2} : x.i = y.i \text{ for some } y \in M_f\} = \{x \in M_{3,2} : x.i = 16\} = \{2\}$
$M_g = M_{5,2} = \{x \in M_{5,1} : x.g = r_2.g\} = \{x \in M_{5,1} : x.g = 9\} = \{3\}$
$M_h = M_{7,1} = \{x \in M_{7,0} : x.h = r_2.h\} = \{x \in M_{7,0} : x.h = 10\} = \{1\}$
$M_{hk^{-1}} = M_{3,4} = \{x \in M_{3,3} : x.k = y.k \text{ for some } y \in M_h\} = \{x \in M_{3,3} : x.k = 1\} = \{2\}$ Analogously, the tuple construction counter is increased to t=3; $r_3=2$, and the iterator $it_3$ points to the end of $M_{3,4}=\{2\}$. Using the attribute value $r_3 \cdot z=12$, the next partial specialization $\Gamma_3=\Gamma_2(r_3)$ is computed, as in block 845. Substituting the attribute value $r_3 \cdot z=12$ into $\Gamma_2$ leads to:

$$\Gamma_3=12^2+(R_4 \cdot z)^2+(R_5 \cdot z)^2(R_6 \cdot z)^2+(R_7 \cdot z)^2<=900$$

This expression can be simplified to:

$$\Gamma_3=(R_4 \cdot z)^2+(R_5 \cdot z)^2+(R_6 \cdot z)^2+(R_7 \cdot z)^2<=756$$

As $\Gamma_3$ is not identical to False, all matching sets with tail t(M)=3 are computed:

TABLE 14

Computed Matching Sets Depending on $(r_1 = 3, r_2 = 5, r_3 = 2)$ $M_i = M_{4,3} = \{x \in M_{4,2} : x.i = r_3.i\} = \{x \in M_{4,2} : x.i = 16\} = \{4\}$
$M_j = M_{6,2} = \{x \in M_{6,1} : x.j = r_3.j\} = \{x \in M_{6,1} : x.j = 15\} = \{1, 5\}$
$M_k = M_{7,2} = \{x \in M_{7,1} : x.k = r_3.k\} = \{x \in M_{7,1} : x.k = 1\} = \{1\}$
$M_{kl^{-1}} = M_{4,4} = \{x \in M_{4,3} : x.l = y.l \text{ for some } y \in M_k\} = \{x \in M_{4,3} : x.l = 20\} = \{4\}$ Further, the tuple construction counter is increased to t=4; $r_4=4$, and the iterator $it_4$ points to the end of $M_{4,4}=\{4\}$. Using the attribute value $r_4 \cdot z=12$, the next partial specialization $\Gamma_4=\Gamma_3(r_4)$ is computed, as in block 845. Substituting the attribute value $r_4 \cdot z=12$ into $\Gamma_3$ leads to:

$$\Gamma_4=12^2+(R_5 \cdot z)^2+(R_6 \cdot z)^2+(R_7 \cdot z)^2<=756$$

This expression can be simplified to:

$$\Gamma_4=(R_5 \cdot z)^2+(R_6 \cdot z)^2+(R_7 \cdot z)^2<=612$$

As $\Gamma_4$ is not False, all matching sets with tail t(M)=4 are computed. This is only one set: $M_l=M_{7,3}=\{x \in M_{7,2}: x \cdot l=r_4 \cdot l\}=\{x \in M_{7,2}:x \cdot l=20\}=\{1\}$.

Further, the tuple construction counter is increased to t=5, $r_5=3$, and the iterator $it_5$ points to row the end of $\in M_{5,2}=\{3\}$. Using the attribute value $r_5 \cdot z=4$, the next partial specialization $\Gamma_5=\Gamma_4(r_5)$ is computed, as in block 845. Substituting the attribute value $r_5 \cdot z=4$ in $\Gamma_5$ leads to:

$$\Gamma_5=4^2+(R_6 \cdot z)^2+(R_7 \cdot z)^2<=612$$

This expression can be simplified to:

$$\Gamma_5=(R_6 \cdot z)^2+(R_7 \cdot z)^2<=596$$

Since $\Gamma_5$ is not False and there are no matching sets to compute, step 860 of method 802 is skipped and the algorithm proceeds with increasing the counter t, as in step 865. Thus, the tuple construction counter is increased to t=6, $r_6=1$ and the iterator $it_6$ points to the end of $\in M_{6,2}=\{1,5\}$. Using the attribute value $r_6 \cdot z=20$, the next partial specialization $\Gamma_6=\Gamma_5(r_6)$ is computed. Substituting the attribute value $r_6 \cdot z=20$ into $\Gamma_5$ leads to:

$$\Gamma_6=20^2+(R_7 \cdot z)^2 <= 596$$

This expression can be simplified to:

$$\Gamma_5=(R_7 \cdot z)^2 <= 196$$

Since $\Gamma_6$ is not False and there are no matching sets to compute, step 860 of method 802 is skipped and the algorithm proceeds with increasing the counter t, as in step 865. Thus, the tuple construction counter is increased to $t=7$, $r_7=1$, and the iterator $it_7$ points to tire end of $\in M_{7,3}=\{1\}$ Using the attribute value $r_7 \cdot z=14$, the next partial specialization $\Gamma_7=\Gamma_6(r_7)$ is computed. Substituting the attribute value $r_7 \cdot z=14$ into $\Gamma_6$ leads to: $\Gamma_7=14^2<=196$, which makes: $\Gamma_7$ True. According to block 750 of algorithm 700, the value of the counter t is equal to the number N of nodes in the materialization graph MG 510. The first full 7-tuple $(r_1=3, r_2=5, r_3=2, r_4=4, r_5=3, r_6=1, r_7=1) \in R_1 \times R_2 \times R_3 \times R_4 \times R_5 \times R_6 \times R_7$ satisfying the complete WHERE clause has been constructed (at block 860).

However, there may be more than one full 7-tuple satisfying the complete WHERE clause of the join query. The algorithm 700 continues to search for any other possible tuples. At block 855, the tuple construction counter is decreased to $t=6$, so that all matching sets with tail $t(M)<=5$ can be reused (which are all matching sets). Thus, the tuple construction counter is $t=6$; $r_6=5$; and the iterator $it_6$ points to the end of $M_{6,2}$. Using the attribute value $r_6 \cdot z=21$, from the old partial specialization $\Gamma_5=(R_6 \cdot z)^2+(R_7 \cdot z)^2<=596$, which is also reused, the next partial specialization $\Gamma_6$ is computed. Substituting the attribute value $r_6 \cdot z=21$ into $\Gamma_5$ leads to: $\Gamma_6=21^2+(R_7 \cdot z)^2<=596$, which is: $\Gamma_6=(R_7 \cdot z)^2<=155$.

Similarly, the partial specialization $\Gamma_6$ is not False and since there are no matching sets to compute, the algorithm proceeds with increasing the counter t, as in step 865. Again, the tuple construction counter is increased to $t=7$ and iterator $it_7$ points to $1 \in M_{7,3}=\{1\}$. It should be noted that the matching set $M_{7,3}$ is also reused without being recomputed since $t(M_{7,3})=4$, the matching set $M_{7,3}$ depends exactly on $(r_1=3, r_2=5, r_3=2, r_4=4)$, which did not change. The tuple construction counter is $t=7$; $r_7=1$; and the iterator $it_7$ points to the end of $M_{7,3}$. Using the attribute value $r_7 \cdot z=14$, the partial specialization $\Gamma_7=\Gamma_6(r_7)$ is computed. Substituting the attribute value $r_7 \cdot z=14$ into $\sqrt[3]{6}$ leads to: $\Gamma_7=14^2<=155$, which makes: $\Gamma_7$=False. This means that the algorithm reached $t=7$ for the second time, but $\Gamma_7$=False implies that the second full 7-tuple $(r_1=3, r_2=5, r_3=1, r_4=4, r_5=3, r_6=5, r_7=1)$ that satisfies all join conditions, does yet not satisfy the complete WHERE clause. Since the current iterator positions are: $it_7$ pointing to the end of $M_{7,3}$; $it_6$ pointing to the end of $M_{6,2}$; $it_5$ pointing to the end of $M_{5,2}$; $it_4$ pointing to the end of $M_{4,4}$; $it_3$ pointing to the end of $M_{3,4}$; $it_2$ pointing to the end of $M_{2,3}$; and $it_1$ pointing to the end of $M_{1,0}$, no more 7-tuples can be created. In view of these iterator positions, the algorithm decreases from $t=7$ fully down to $t=0$, causing the algorithm to finally terminate. At this point, the already found 7-tuple $(r_1=3, r_2=5, r_3=2, r_4=4, r_5=3, r_6=1, r_7=1)$ is in fact the only 7-tuple satisfying the complete WHERE clause.

It should be noted that in the example describing methods 801 and 802, in most cases the general relation $M_{n,i} \subseteq M_{n,i-1}$ was satisfied by equality and that no matching set was ever encountered empty. This was due to the fact that the previous reduction of the full relations $R_n$ to the reduction results $M_{n,0}$ to was considered as "perfect". This means that the reduction results $M_{n,0}$ to were as small as possible—every $M_{n,0}$ equaled the projection of the solution of the join conditions alone to $R_n$. However, a perfect reduction is not possible for all join graphs and all distributions of data. In the current example, the failure of a partial tuple to complete to a full tuple was only caused by some partially specialized operator tree becoming False. However, in other embodiments this could also be caused by some matching set becoming empty.

The algorithm for join tuple assembly by partial specializations (700) handles the assembly phase of the method for join query evaluation by semijoin reduction. It improves it simultaneously with regard to time and space consumption. The algorithm is applicable to outer joins as well as to inner joins, since the differences in the evaluation procedure derived from the join type occur only in the reduction phase, which is before the join tuple assembly phase. Further, the algorithm does not require flattening the join graph into a tree in the reduction phase, by showing how to handle cycles in the assembly phase. In an embodiment, the algorithm is suitable for first-k queries and is applicable to pure join queries ($\Gamma$=True). Moreover, algorithm 700 is not limited to the method of semi-join reduction: it can be used as a general method for evaluating any join query, as previous reductions accelerate the method, but are not a prerequisite; the algorithm stays correct if in place of $M_{n,0}$ any set S with $M_{n,0} = \subseteq S \subseteq R_n$ is taken. Finally, algorithm 700 is well suited to distributed computation. The row IDs in $M_{1,0}$ can be distributed to distinct processors for possible completion to a join tuple; if $|M_{1,0}|$ is too small for this distribution, the pairs of $M_{1,0} \times M_{2,0}$ can be distributed, and so on.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
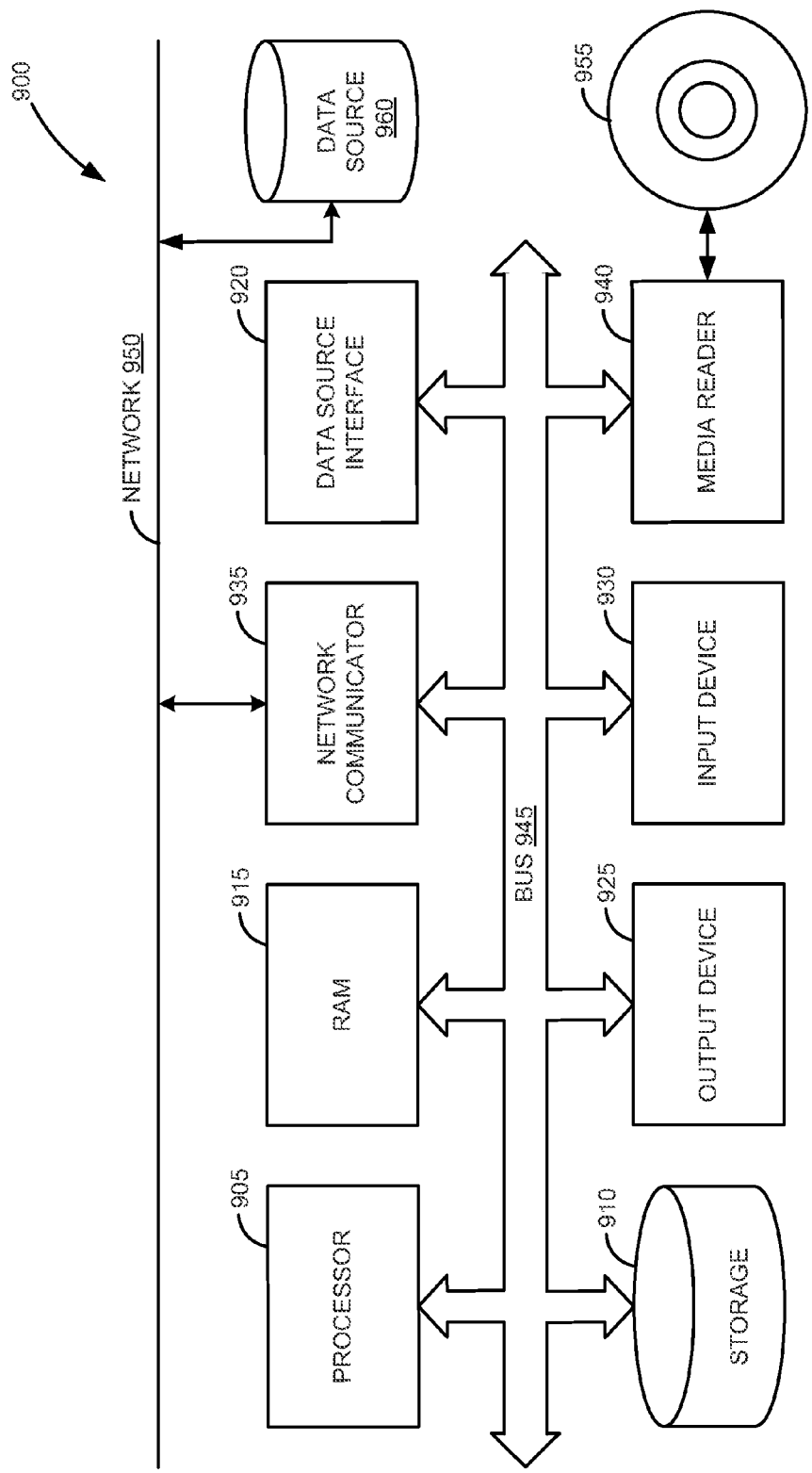
FIG. 9 is a block diagram illustrating an exemplary computer system 900.

FIG. 9 is a block diagram illustrating an exemplary computer system 900. The computer system 900 includes a processor 905 that executes software instructions or code stored on a computer readable storage medium 955 to perform the above-illustrated methods of the invention. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to visual information to users and an input device 930 to provide a user or another device with means for entering data and/or otherwise interact with tire computer system 900. Each of these output 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be access via one or more abstraction layers implemented in hardware or software. For example, the data source 960 may be access by network 950. In some embodiments the data source 960 may be accessed via an abstraction layer, such as, a semantic layer.

A data source 960 is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   receive a join query, a materialization graph representing a join part of the join query, and a plurality of matching sets derived from reduction of a plurality of relations;
   configure a tuple construction counter, which value indicates progression in an overall length of constructing a join tuple, and an iterator that traverses a matching set from the plurality of matching sets; and
   (A) determine a value of the tuple construction counter, wherein upon determining that the value of the tuple construction counter is a positive integer:
      (a) compute a partial specialization of an operator tree, wherein the operator tree represents a non-join part of the join query;
      (b) when the computed partial specialization satisfies the non-join part of the join query and the value of the tuple construction counter is less than the overall length of the join tuple to be constructed, recompute a subset of the plurality of matching sets;
      (c) when no empty matching set is encountered during recomputation, increase the value of the tuple construction counter by one count; and
      (d) when the computed partial specialization does not satisfy the non-join part of the join query or an empty matching set is encountered during recomputation, decrease the value of the tuple construction counter by one or more counts and continue to step A.

2. The article of manufacture of claim 1, further comprising instructions, which when executed by the computer, cause the computer to:

(e) when the value of the tuple construction counter is equal to the overall length of the join tuple, identify a first join tuple satisfying the join part and the non-join part of the join query.

3. The article of manufacture of claim 2, further comprising instructions, which when executed by the computer, cause the computer to:

continue steps (a) to (e) until the value of the tuple construction counter is equal to zero, wherein all join tuples satisfying the join part and the non-join part of the join query are identified when the value of the tuple construction counter is equal to zero.

4. The article of manufacture of claim 1, wherein the first join tuple is used directly in a functionality or stored in a storage unit.

5. The article of manufacture of claim 1, wherein the subset of the plurality of matching sets is recomputed with a tail function equal to the value of the tuple construction counter.

6. The article of manufacture of claim 1, wherein the subset of the plurality of matching sets represents reduction results derived from semi-join reduction of the plurality of relations.

7. The article of manufacture of claim 1, wherein the join part and the non-join part of the join query represent a plurality of Boolean conditions.

8. A computer-implemented method comprising:

receiving a join query, a materialization graph representing a join part of the join query, and a plurality of matching sets derived from reduction of a plurality of relations;

a processor of the computer configuring a tuple construction counter, which value indicates progression in an overall length of constructing a join tuple and an iterator that traverses through elements in a matching set from the plurality of matching sets; and (A) the processor of the computer determining a value of the tuple construction counter, wherein upon determining that the value of the tuple construction counter is a positive integer:

(a) computing a partial specialization of an operator tree, wherein the operator tree represents a non-join part of the join query;

(b) when the computed partial specialization satisfies the non-join part of the join query and the value of the tuple construction counter is less than the overall length of the join tuple to be constructed, recomputing a subset of the plurality of matching sets;

(c) when no empty matching set is encountered during recomputation, increasing the value of the tuple construction counter by one count; and (d) when the computed partial specialization does not satisfy the non-join part of the join query or an empty matching set is encountered, decreasing the value of the tuple construction counter and continue to step A.

9. The method of claim 8, further comprising:

(e) when the value of the tuple construction counter is equal to the overall length of the join tuple, identifying a first join tuple satisfying the join part and the non-join part of the join query.

10. The method of claim 9, further comprising:

continuing steps (a) to (e) until the value of the tuple construction counter is equal to zero, wherein all join tuples satisfying the join part and the non-join part of the join query are identified when the value of the tuple construction counter is equal to zero.

11. The method of claim 8, wherein the first join tuple is used directly in a functionality or stored in a storage unit.

12. The method of claim 8, wherein the subset of the plurality of matching sets is recomputed with a tail function equal to the value of the tuple construction counter.

13. The method of claim 8, wherein the subset of the plurality of matching sets represent reduction results derived from semi-join reduction of the plurality of relations.

14. The method of claim 8, wherein the join part and the non-join part of the join query represent a plurality of Boolean conditions.

15. A computing system comprising:

a database storage unit for storing one or more of a plurality of matching sets derived from reduction of a plurality of relations, a join query, and a materialization graph representing a join part of the join query;

a processor in communication with the database storage unit that executes instructions including:

configuring a tuple construction counter, which value indicates progression in an overall length of constructing a join tuple and an iterator that traverses through elements in a matching set from the plurality of matching sets; and (A) determining a value of the tuple construction counter, wherein upon determining that the value of the tuple construction counter is a positive integer:

(a) computing a partial specialization of an operator tree, wherein the operator tree represents a non-join part of the join query;

(b) when the computed partial specialization satisfies the non-join part of the join query and the value of the tuple construction counter is less than the overall length of the join tuple to be constructed, recomputing a subset of the plurality of matching sets;

(c) when no empty matching set is encountered during recomputation, increasing the value of the tuple construction counter by one count; and (d) when the computed partial specialization does not satisfy the non-join part of the join query or an empty matching set is encountered, decreasing the value of the tuple construction counter and continue to step A.

16. The computing system of claim 15, the processor executes instructions further including:

(e) when the value of the tuple construction counter is equal to the overall length of the join tuple, identifying a first join tuple satisfying the join part and the non-join part of the join query.

17. The computing system of claim 16, the processor executes instructions further including:

continuing steps (a) to (e) until the value of the tuple construction counter is equal to zero, wherein all join tuples satisfying the join part and the non-join part of the join query are identified when the value of the tuple construction counter is equal to zero.

18. The computing system of claim 15, wherein the first join tuple is used directly in a functionality or stored in a storage unit.

19. The computing system of claim 15, wherein the subset of the plurality of matching sets is recomputed with a tail function equal to the value of the tuple construction counter.

20. The computing system of claim 15, wherein the subset of the plurality of matching sets represent reduction results derived from semi-join reduction of the plurality of relations.

21. The computing system of claim 15, wherein the join part and the non-join part of the join query represent a plurality of Boolean conditions.

* * * * *